United States Patent [19]
Arita et al.

[11] Patent Number: 5,172,234
[45] Date of Patent: Dec. 15, 1992

[54] CAMERA HAVING AN ELECTRONIC ZOOMING DISPLAY FEATURE

[75] Inventors: Hiroshi Arita, Kanagawa; Akira Egawa, Tokyo, both of Japan

[73] Assignee: Canon Kabushiki Kaisha, Tokyo, Japan

[21] Appl. No.: 742,187

[22] Filed: Aug. 2, 1991

Related U.S. Application Data

[63] Continuation of Ser. No. 227,309, Aug. 2, 1988, abandoned.

[30] Foreign Application Priority Data

Aug. 4, 1987 [JP] Japan ............................. 62-194611
Sep. 8, 1987 [JP] Japan ............................. 62-224255
Sep. 11, 1987 [JP] Japan ............................. 62-227752

[51] Int. Cl.⁵ .................... H04N 5/30; H04N 5/225
[52] U.S. Cl. .............................. 358/224; 358/909; 354/222
[58] Field of Search ............. 358/224, 209, 909, 225, 358/227; 354/222, 219, 106; 382/47

[56] References Cited

U.S. PATENT DOCUMENTS

| 3,953,666 | 4/1976 | Justice et al. | 358/146 |
| 4,527,201 | 7/1985 | Cappels | 358/224 |
| 4,760,413 | 7/1988 | Taniguchi et al. | 354/106 |
| 4,884,089 | 11/1989 | Taniguchi et al. | 354/222 |

FOREIGN PATENT DOCUMENTS 212746 10/1985 Japan .
212747 10/1985 Japan .

Primary Examiner—Herbert Goldstein
Assistant Examiner—Wendy R. Greening
Attorney, Agent, or Firm—Fitzpatrick, Cella, Harper & Scinto

[57] ABSTRACT

A camera includes an electronic zooming feature to selectively transform an image actually received at an image sensor into a displayed image at a photographing plane according to different angles of view corresponding to different zooming ratios. The image actually received is converted to binary data and stored in memory according to address coordinates. Electronic zooming is performed without affecting the optical system of the camera by reading stored data from memory to obtain an area defined by selected address coordinates and displaying an image corresponding to a desired focal length.

6 Claims, 22 Drawing Sheets

FIG.2(a)
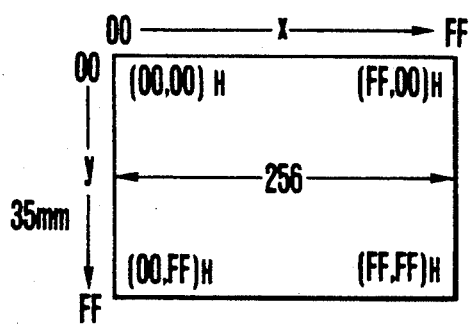
FIG.2(a')
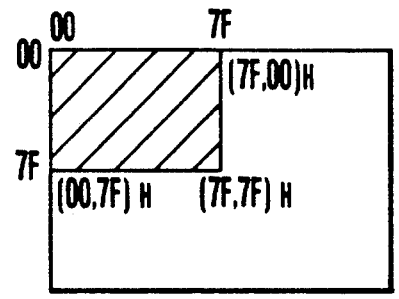
FIG.2(b)
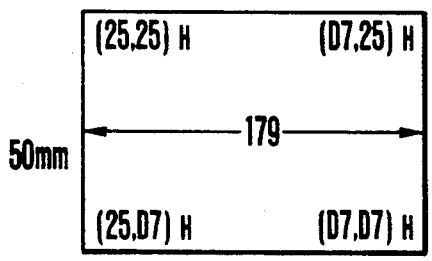
FIG.2(b')
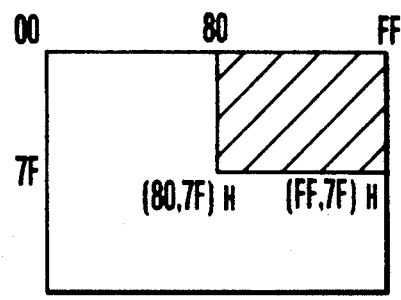
FIG.2(c)
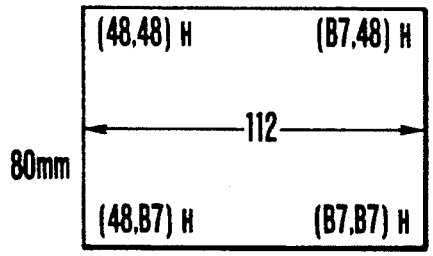
FIG.2(c')
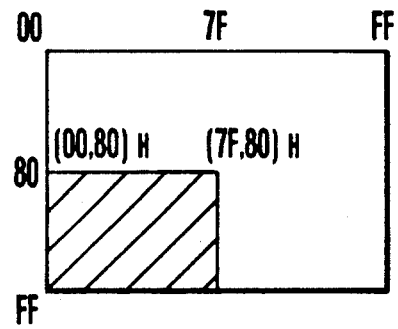
FIG.2(d)
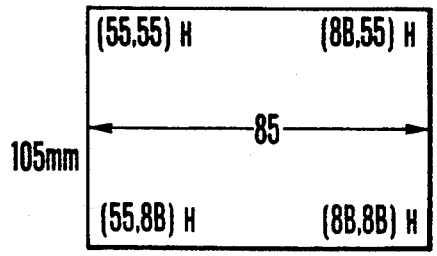
FIG.2(d')
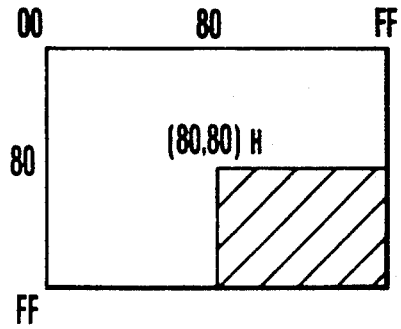

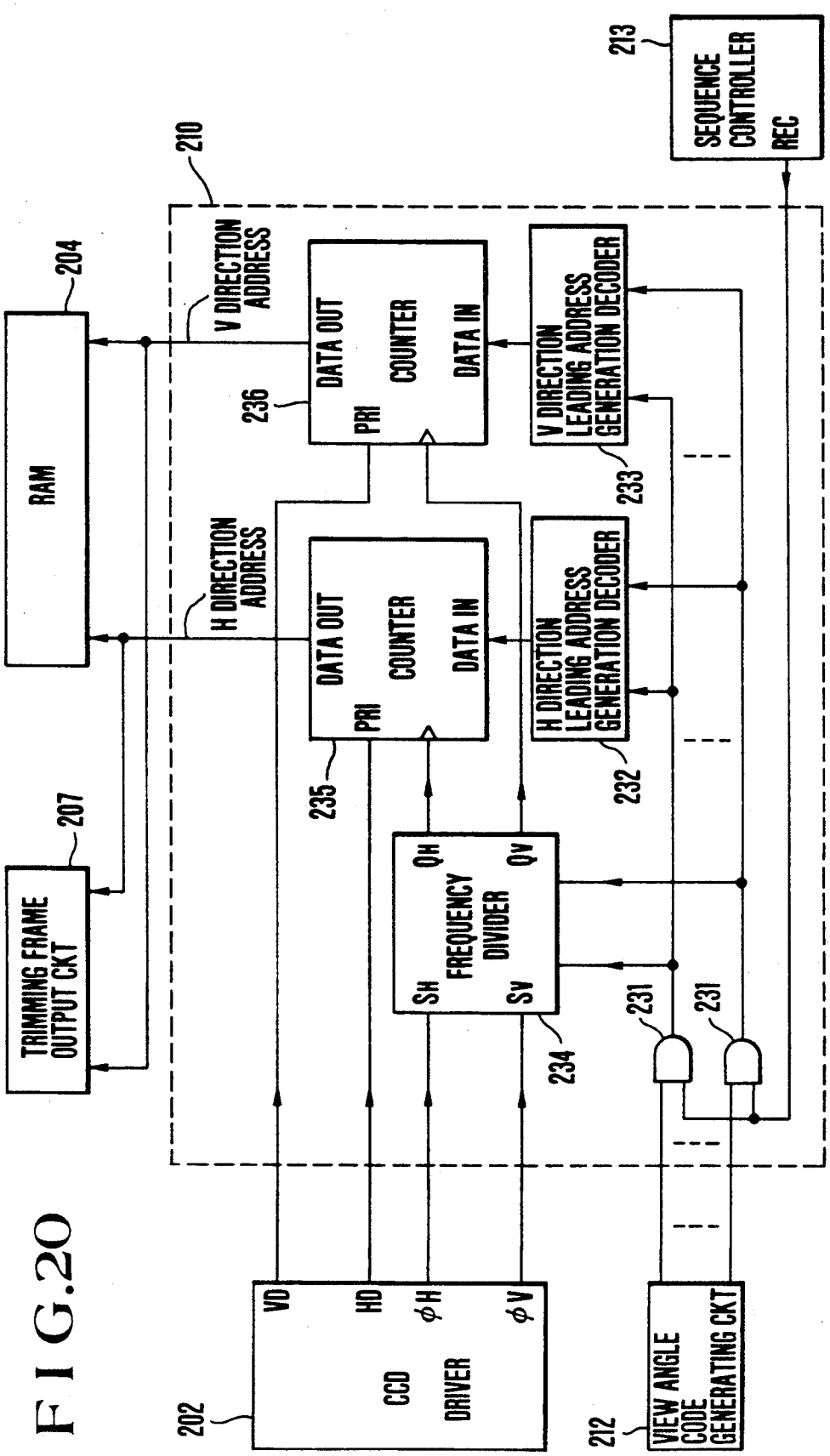
F I G. 20

CAMERA HAVING AN ELECTRONIC ZOOMING DISPLAY FEATURE

This application is a continuation of application Ser. No. 07/227,309 filed Aug. 2, 1988, now abandoned.

BACKGROUND OF THE INVENTION

1. Field of the Invention

This invention relates to a camera arranged to have information on the angle of view displayed by display means for displaying image information.

2. Description of the Related Art

A method of displaying a plurality of angles of view on an electronic viewfinder has been proposed for a camera having an electronic viewfinder.

Meanwhile, in the field of the silver-halide film type camera, there is a concept called "pseudo-zoom". In accordance with this, photographing operations are to be always carried out at a short focal length with information imprinted on the film designating a trimming to be made at the time of printing. This concept is becoming feasible.

The former method, however, has presented the following problem. In cases where one of a plurality of angles of view is selectable, it is difficult to decide which of these angles of view is the best for the image.

The latter method is advantageous in that the use of an electronic viewfinder enables the photographer to see a zoomed image without using any zooming optical system. However, this method also presents the same problem as in the case of the former with respect to the selection of the best angle of view.

SUMMARY OF THE INVENTION

This invention is directed to the solution of the above stated problem of the prior art. It is therefore a first object of the invention to provide a camera which facilitates selection of an angle of view and, for this purpose, is provided with display means for displaying image information; and control means for controlling and causing the display means to simultaneously display a plurality of images of different angles of view.

It is a second object of the invention to provide a camera which facilitates selection of an angle of view and comprises display means for displaying image information; and control means for controlling and causing the display means to display a range of view angles and to differentiate a luminance obtained within the view angle range from a luminance obtained outside the range.

It is a third object of the invention to provide a camera which makes the state of angle of view readily perceptible and, for that purpose, comprises display means for displaying image information; and control means for controlling and causing the display means to display an index indicating a view angle range and to selectively display an image in an enlarged state according to the angle of view.

Other objects and features of the invention will become apparent from the following detailed description of embodiments thereof taken in connection with the accompanying drawings.

BRIEF DESCRIPTION OF THE DRAWINGS

FIGS. 2(a), 2(a'), 2(b), 2(b'), 2(c), 2(c'), 2(d) and 2(d') are detailed illustrations of the addresses of the display image planes shown in FIGS. 1(a), 1(b) and 1(c).

FIG. 20 is a circuit diagram showing the details of an address generating circuit of FIG. 17.

DETAILED DESCRIPTION OF THE PREFERRED EMBODIMENTS

Figure 1A:
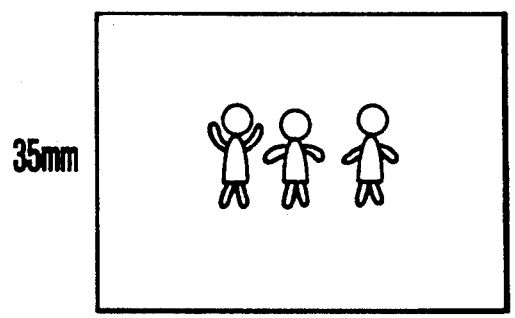
FIGS. 1(a), 1(b) and 1(c) are illustrations of display image planes obtained by a first embodiment of this invention.
Figure 1B:
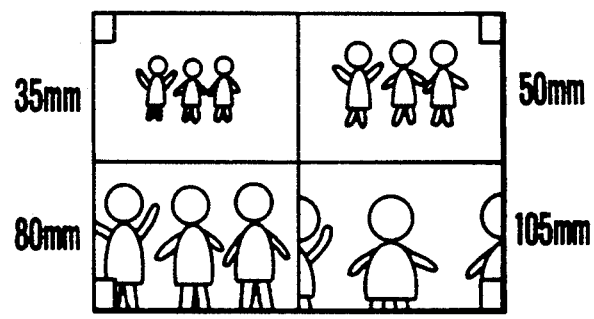
Figure 1C:
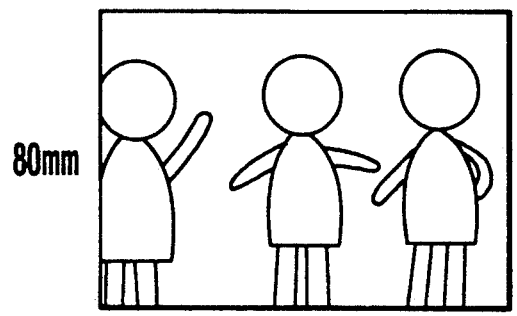

FIGS. 1(a), 1(b) and 1(c) show display image planes obtained by a first embodiment of this invention. Of these illustrations, FIG. 1(a) shows an object's image actually received at an image sensor. For example, this corresponds to a photographing image plane taken by a lens of focal length 35 mm mounted on a 35 mm camera using a silver halide film. FIG. 1(b) shows an image plane including, along with the photographing image planes corresponding to pseudo-zoomed focal lengths of 50 mm, 80 mm and 105 mm which are obtained by electronic zooming and shown along with the photographing plane corresponding to the focal length of 35 mm with the image plane divided for a simultaneous display. FIG. 1(c) shows a case where an image plane is selected from among the different zooming ratios, that is, trimming ratios shown in FIG. 1(b).

FIGS. 2(a) to 2(d') show varied methods for displaying the quartered image plane of FIG. 1(b). FIG. 2(a) shows the addresses of images which are taken into the image sensor and stored at a memory. The image plane has addresses from 00H to FFH both in the horizontal and vertical directions. In terms of coordinates, the right upper end is (FF, 00)H, which becomes the data of a memory address of FF00H. To have this image displayed in a quadrant image plane, data is read out in such a way as to gain ten memory addresses for five display address and to have the start address of the display addresses at a coordinate (00, 00)H as shown in FIG. 2(a'). FIGS. 2(b), 2(c) and 2(d) respectively show the address areas of the image planes to be displayed when an electronic zooming action is performed on the image plane of FIG. 2(a).

FIG. 2(b) shows a display obtained with the electronic zooming performed to an extent corresponding to the focal length of 50 mm. In this case, the image of an area comes to be defined by coordinates from (25, 25)H to (D7, D7)H. The data of this area is displayed as follows: In the case that the data is to be displayed in one image plane, the data is read out at a rate of gaining seven memory addresses for ten display addresses. If the data is to be displayed in a quadrant image plane, the data is read out at a rate of gaining seven memory addresses for five display addresses. Further, the start address of the display addresses is set at the coordinate (80, 00)H as shown in FIG. 2(b').

FIG. 2(c) shows an address area of the display image plane obtained by electronic zooming to an extent corresponding to the focal length of 80 mm. The electronic zooming is performed to obtain an area defined by coordinates (48, 48)H and (B7, B7)H by reading data at a rate of gaining seven memory addresses for 16 display addresses. Further, with a display start address set at an coordinate (00, 80)H as shown in FIG. 2(c'), a display of an image corresponding to the focal length of 80 mm is made in a quadrant part of the image plane on the lower left side thereof by reading out data at a rate of gaining seven memory addresses for eight display addresses.

FIG. 2(d) shows an area corresponding to the focal length of 105 mm, that is, a memory area defined by coordinates from (55, 55)H to (8B, 8B)H. In this case, a zoomed image plane is displayed by reading out data at a rate of gaining one memory address for three display addresses. Further, the image plane can be displayed as a part of a multiple image plane by reading out data at a rate of gaining two memory addresses for three display addresses, with a start display address set at a coordinate (80, 80)H as shown in FIG. 2(d').

Figure 3:
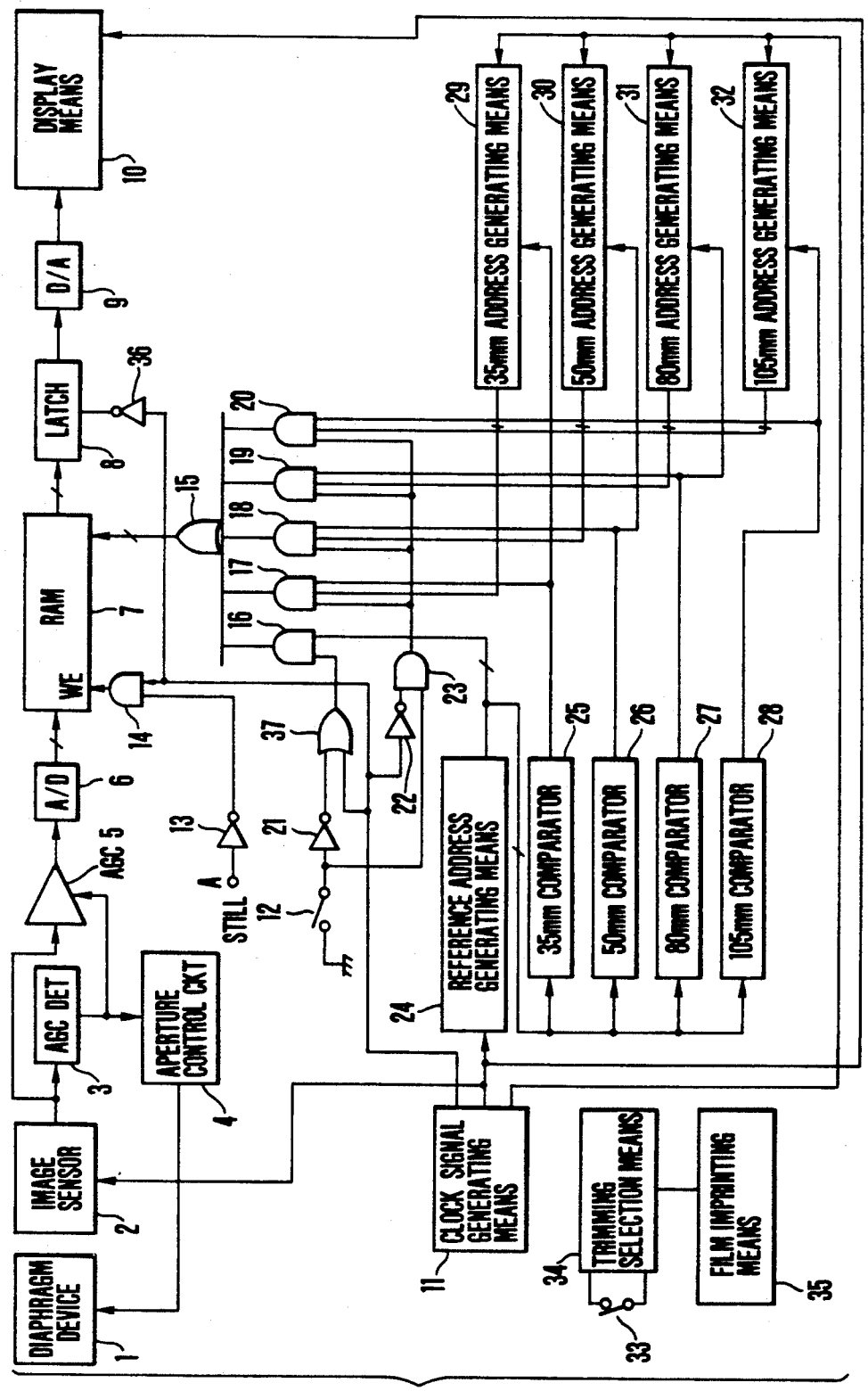
FIG. 3 is a circuit diagram of the first embodiment.

FIG. 3 shows by way of example a circuit which gives the quartered image plane which is as represented by FIG. 1(b). Note that in the ensuing description given with reference to the accompanying drawings, the parts indicated by the same reference numerals and symbols are assumed to have, the same functions.

Referring to FIG. 3, an object's image taken in by an image sensor 2 is produced in the form of an image signal. This signal is supplied to a variable gain level detecting means (hereinafter referred to as AGC DET) 3. The AGC DET 3 obtains the brightness of the image as a whole. If the brightness thus obtained is inadequate, the AGC DET 3 produces a correction signal. The correction signal is supplied to a variable gain amplifier 5 and is produced as an image signal having an adequate degree of brightness. At the same time, the correction signal is supplied also to an aperture control circuit 4. The circuit 4 then controls a diaphragm device 1 in such a way as to adjust the quantity of light incident on the image sensor 2 to an apposite quantity. The corrected image signal is converted into digital information or data by an A/D converting means 6. The digital data is stored at a RAM 7. The data of the RAM 7 is selected under address control according to a reference address. The selected data is latched by a latching means 8. After that, the latched data is converted into an analog value by a D/A converting means 9. The analog value is then displayed by a display means 10. A multiple display selection switch 12 then selects a multiple image plane or a single image plane. In the case of the single image plane, the switch 12 is turned on to supply a low level output to an inverter 21 and an AND gate 16. The AND gate 16 is thus arranged to receive a high level signal via an OR gate 37. An AND gate 23 is arranged to produce a low level output. Therefore, among AND gates 16 to 20, the signal of the AND gate 16 is alone supplied to an OR gate 15. The OR gate 15 and AND gates 16 to 20 are arranged in one set, which is arranged to supply an address signal to the RAM 7. In other words, the OR gate and the AND gates are arranged in a set which corresponds to the number addresses. The output terminal of the OR gate 15 is provided with a bus line for designating addresses of the RAM 7. However, the drawing does not show all the addresses for the sake of simplification of illustration. The AND gates and the OR gate are likewise shown in a simplified manner. Clock signal generating means 11 produces a clock signal. The clock signal is supplied to reference address generating means 24, which is composed of a counter. The reference address generating means 24 is arranged to produce an address signal which is supplied to the RAM 7 via the AND gate 16 and the OR gate 15. Data read out from the RAM 7 is displayed at the display means 10. At the same time, clock signals are supplied also to an AND gate 14 and an inverter 36. When a low level signal is supplied from a terminal A indicating a motion picture display mode, the low level signal is changed into a high level signal by the inverter 13. Then, this signal is supplied to a terminal WE of the RAM 7 and thus serves as data writing signal. An inverted clock signal is produced from the inverter 36 to serve as a latching timing signal for the latching means 8. Data is thus latched for the purpose of supplying data to the display means 10 even in the event of no output from the RAM 7 during a writing process. When a high level signal indicative of a still picture display mode is supplied from the terminal A, the inverter 13 produces a low level signal. The terminal WE then receives no writing signal from the AND gate 14. Therefore, one image plane of a still image is retained at the RAM 7.

In case the multi-display selection switch 12 is turned off to select a multiple image plane, a low level signal is supplied from an inverter 21 to an OR gate 37. The OR gate 37 then supplies the AND gate 16 with a high level output for a period of time during which the clock signal produced from the clock signal generating means 11 is at a high level, i.e., during a writing period in the motion picture mode. Then, the AND gate 16 supplies to the address of the RAM 7 the address data of the reference address generating means 24. Further, the inverter 22 supplies a high level signal to the AND gate 23 for a period of time during which the clock signal is at a low level. Therefore, a high level signal is supplied to the AND gates 17, 18, 19 and 20. A 35 mm comparator 25 is arranged to see whether the reference address is within the address area shown in FIG. 2(a'). The comparator 25 supplies a high level signal to the AND gate 17 if the reference address is within this area which is located on the upper left-hand side. Then, during the period of this area, the AND gate 17 supplies an address signal to the RAM 7 in such a manner that address data which corresponds to the memory address of FIG. 2(a) selected by a 35 mm address generating means 29 is displayed on the quadrant image plane. A 50 mm comparator 26 is arranged to supply a high level output to the AND gate 18 during the period of the address area shown in FIG. 2(b'). Then, a 50 mm address generating means 30 supplies address data shown in FIG. 2(b) to the RAM 7 to have it displayed on a quadrant image plane.

An 80 mm comparator 27 likewise discriminates the address area shown in FIG. 2(c'). An 80 mm address generating means 31 then supplies address data to the RAM 7 via the AND gate 19 in such a manner that the data of the address area shown in FIG. 2(c) is displayed on a quadrant image plane. A 105 mm comparator 28 likewise discriminates the address area shown in FIG. 2(d'). A 105 mm address generating means 32 then supplies address data to the RAM 7 via the AND gate 20 to have the address data displayed on a quadrant image plane.

The display which is represented by FIG. 1(b) is obtained through the above stated processes. Further, the multiple image plane is obtainable either in the form of a still picture or a motion picture.

The embodiment further comprises a trimming selection switch 33 and a trimming selection means 34, which are arranged to select one of the trimmed image plane from the above stated multiple image plane. The trimming selection means 34 produces trimming degree data. The trimming degree data is arranged to be imprinted on the film by a film imprinting means 35. This imprint permits a pseudo-zooming action to be accomplished by trimming at the time of printing.

Figure 4:
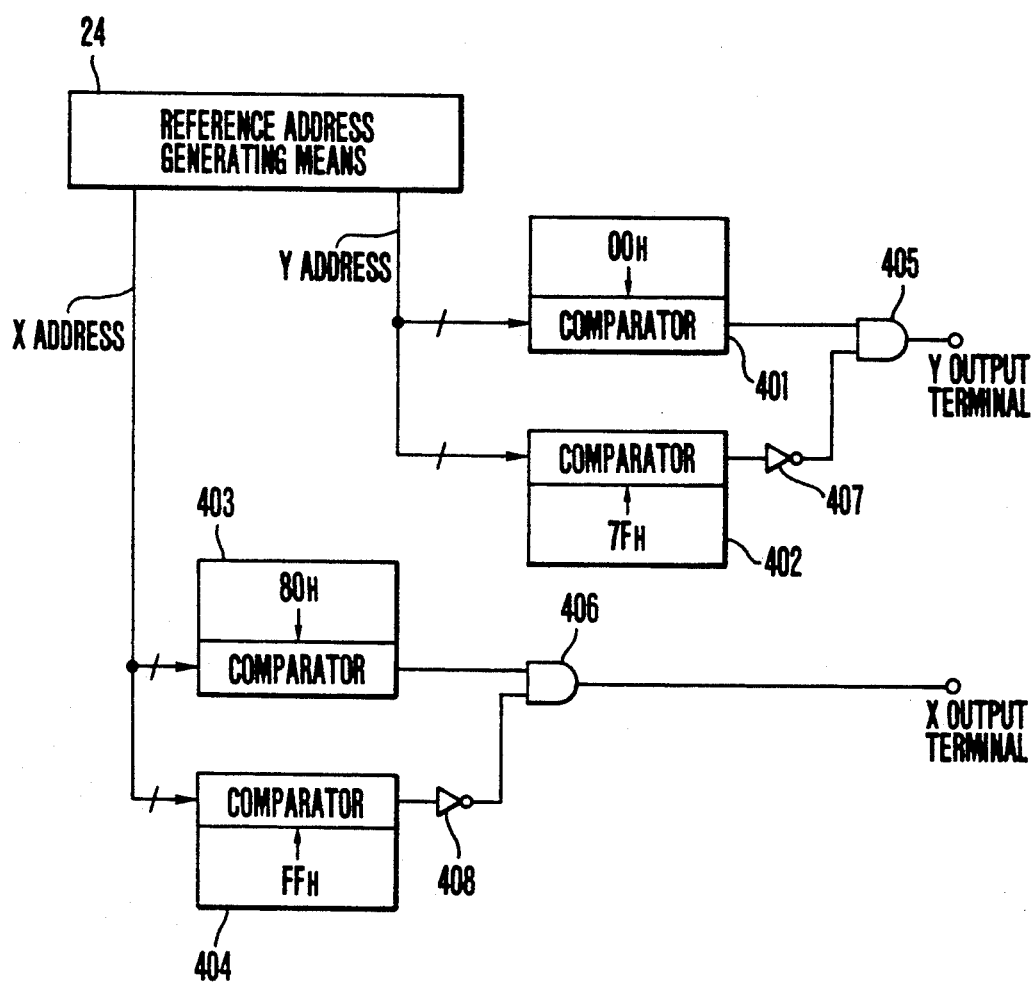
FIG. 4 is a circuit diagram showing the arrangement of each of the comparators of FIG. 3.

FIG. 4 shows the arrangement of the 50 mm comparator 26 by way of example. The same arrangement applies to each of the 35 mm comparator 25, the 50 mm comparator 26, the 80 mm comparator 27 and the 105 mm comparators 28. The data of the reference address generating means 24 corresponding to the addresses of the image sensor 2 and the display means 10 are supplied as X and Y address data respectively to comparators 403 and 404 and to comparators 401 and 402. The reference address data are compared, for example, with the values 80H, FFH, 00H and 7FH representing the addresses of the area corresponding to the focal length of 50 mm shown in FIG. 2(b'). When the Y address data is larger than 00H and smaller than 7FH, the comparator 401 produces a high level output, and the comparator 402 a low level output, respectively. The output of the comparator 402 is inverted to a high level by an inverter 407. Then, an AND gate 405 produces a high level output to a Y output terminal. When the X address data is larger than 80H and smaller than FFH, the comparator 403 produces a high level output, and the comparator 404 a low level output. The low level output of the comparator 404 is inverted by an inverter 408. Then, an AND gate 406 produces a high level output to an X output terminal.

The 35 mm comparator 25, the 80 mm comparator 27 and the 105 mm comparator 28 are arranged in the same manner as the above stated arrangement except that the values to be compared by them are the values shown in FIGS. 2(a'), 2(c') and 2(d') respectively.

Figure 5:
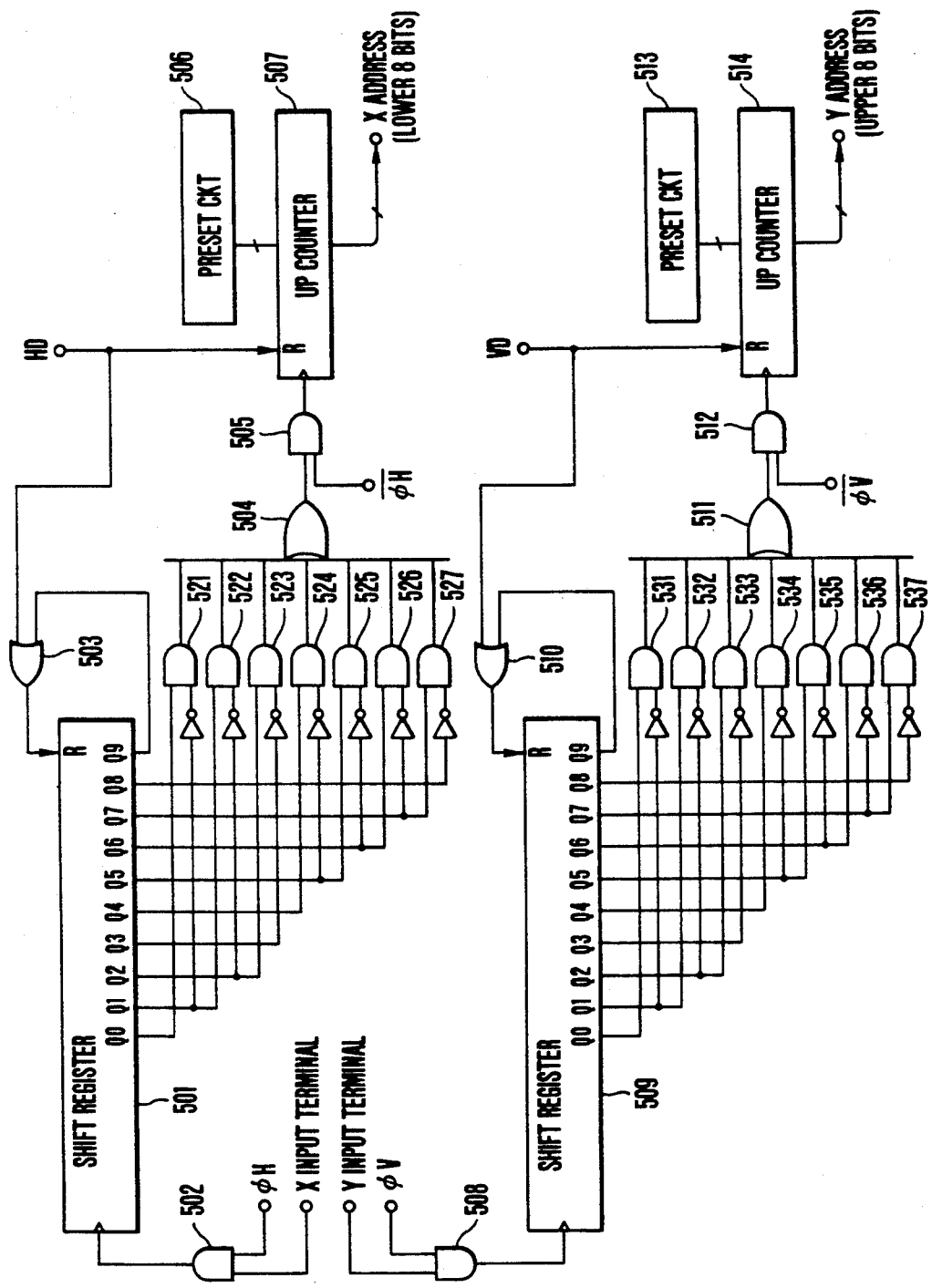
FIG. 5 is a circuit diagram showing the arrangement of address generating means included also in FIG. 3.
Figure 6:
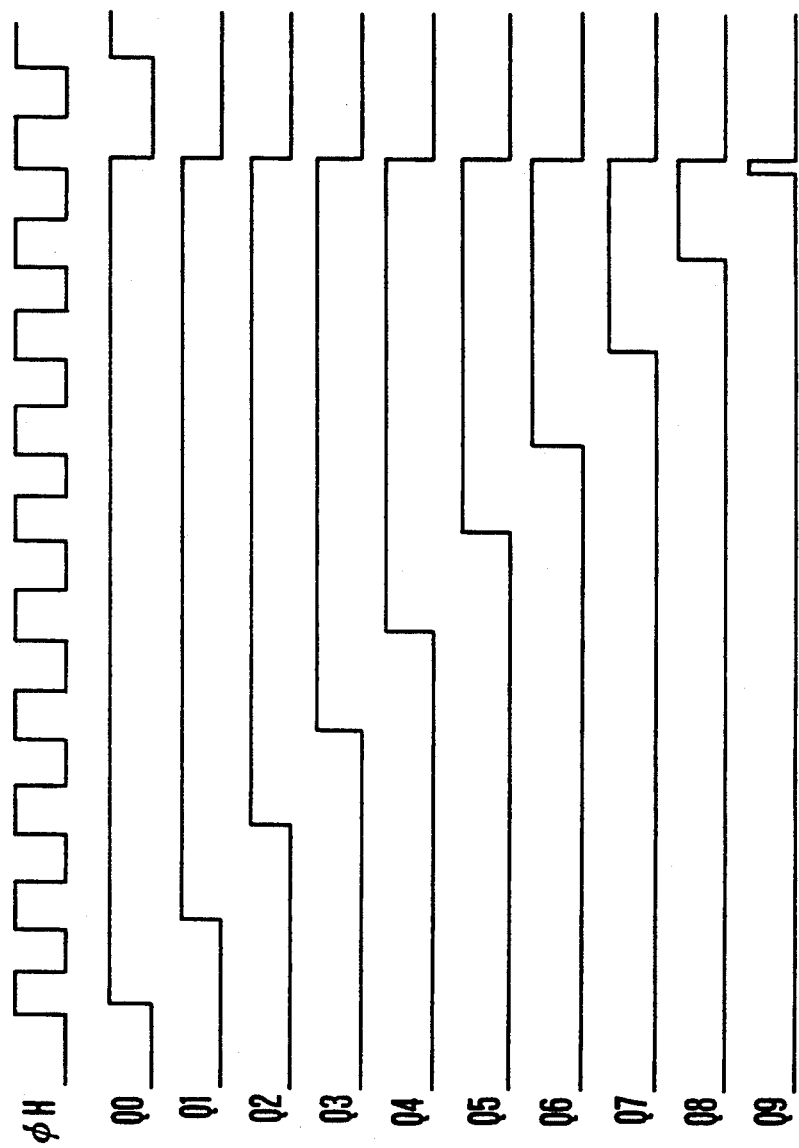
FIG. 6 partly shows the timing of a horizontal transfer clock signal.

FIG. 5 shows by way of example the details of the 50 mm address generating means 30. The address generating means 29 to 32 for 35 mm to 105 mm are arranged in the same manner. Referring to FIG. 5, circuit elements from a shift register 501 through an AND gate 505 are arranged to permit gaining seven memory addresses for five display addresses. A difference brought about in the number of data in the horizontal or vertical direction by a change in the size of the image plane can be corrected by this arrangement. More specifically, when a desired display area is obtained, the output of the X output terminal is supplied to an X input terminal. A high level signal is then supplied to an AND gate 502. Then, a horizontal transfer clock signal $\phi H$ which is two times as high as a horizontal transfer clock signal coming to the display means 10 is supplied from a terminal $\phi H$ to the shift register 501. The timing of this horizontal transfer clock signal $\phi H$ is as shown in FIG. 6. This clock signal causes the levels of the outputs Q0 to Q9 of the shift register 501 to become high one after another. When the level of the output Q9 which is located at a tenth step changes to a high level, this output Q9 comes to reset the shift register 501 via an OR gate 503. Further, the Q outputs of the shift register 501 are supplied to the AND gate 505 with a high level corresponding to seven addresses suitably selected through AND gates 521 to 527 and an OR gate 504. The AND gate 505 then supplies a clock signal which is obtained by inverting the horizontal transfer clock signal $\phi H$ to an up counter 507 to cause the up counter 507 to count up. The up counter 507 is arranged to be reset by the horizontal blanking signal HD of the image signal. At the same time, the shift register 501 is also reset through an OR gate 503.

When the display area of the display image plane becomes a quadrant display area, a high level signal is supplied from the X input terminal. During that period, a zoomed up display becomes possible with the shift register 501 acting to change the increment of the counted value of the up counter 507 which generates the X address data. After the up counter 507 is reset, a start address is preset by a preset circuit 506. The up counter 507 produces an output from an X address terminal as the X address data of the memory. This becomes the lower eight bits of a memory address signal.

When the output of the Y output terminal of FIG. 4 is supplied to a Y input terminal, the lower half of FIG. 5 operates in the same manner to generate Y address data. A shift register 509 is arranged to receive from a terminal $\phi V$ a vertical transfer clock signal which is two times as high as a vertical transfer clock signal to be supplied to the display means 10. In conjunction with AND gates 531 to 537, an OR gate 511 and an AND gate 512, the shift register 509 allows an up counter 514 to count up seven memory addresses for five display addresses according to a clock signal obtained by inverting the clock signal $\phi V$. An OR gate 510 is arranged to reset the shift register 509 by receiving the tenth output of the shift register or the vertical blanking signal VD of the image signal. This signal VD is arranged to also reset the up counter 514. After resetting, the up counter 514 is set at the start address of the Y address data by a preset circuit 513. The up counter 514 is thus arranged to produce from a Y address terminal the upper eight bits of the memory address signal.

While the above description is given for an upper left area of the display image plane of FIG. 2(b'), the same arrangement also applies to other quadrant areas. For example, the coordinate (48, 48)H of FIG. 2(c') is preset by gaining seven memory addresses for eight display addresses by using shift registers of 16 steps.

Figure 7:
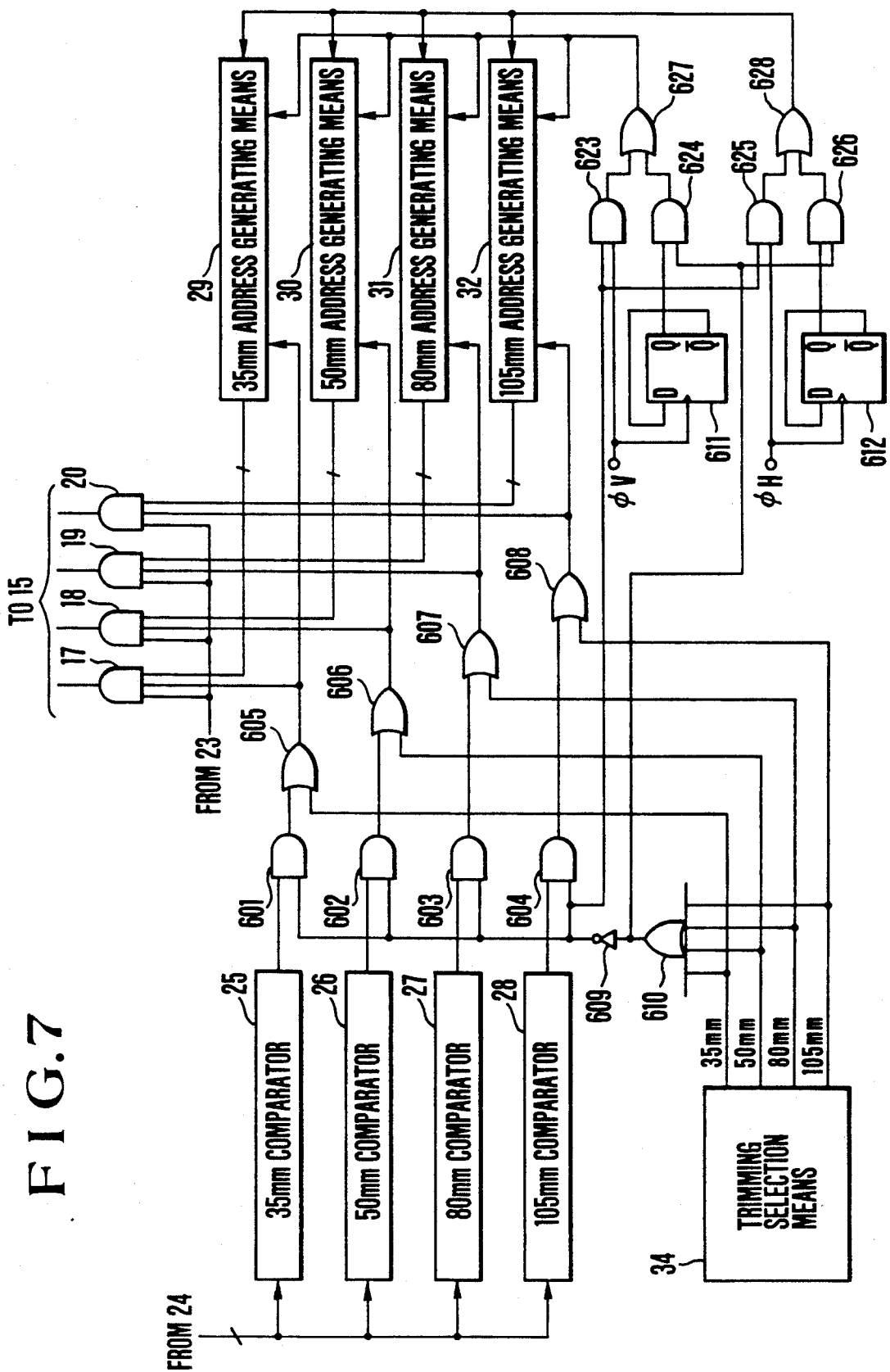
FIG. 7 is a circuit diagram showing a circuit which is arranged to display a trimmed image plane of FIG. 1(c) in a zoomed up state.

FIG. 7 shows a circuit which is capable of displaying in a zoomed-up state a trimmed image plane as shown in FIG. 1(c). Parts performing the same functions as in the case of FIG. 3 are indicated with the same reference numerals. The circuit illustrated enables the embodiment shown in FIG. 3 to make a zoomed up display.

In cases where no trimming is required, the display can be made in a normal manner. In this instance, therefore, trimming selection means produces all the outputs thereof at a low level. An OR gate 610 supplies a low level signal to AND gates 624 and 626. The low level output of the OR gate 610 is inverted into a high level signal by an inverter 609. The high level signal is supplied to AND gates 601 to 604, 623 and 625. Comparators 25 to 28 are arranged to produce outputs in the same manner as in the case of FIG. 3. The clock signals $\phi V$ and $\phi H$ are arranged to be supplied respectively to address generating means 29 to 32 via AND gates 625 and 623 and OR gates 628 and 627 as clock signals for them. The address generating means 29 to 32 are arranged to operate in the same manner as in the case of FIG. 5.

When a degree of trimming is designated by the trimming selection means 34, the level of one of the outputs of the selection means 34, say, an output which corresponds to trimming for the focal length of 80 mm becomes high. Then, the OR gate 610 produces a high level output. Therefore, clock signals $\phi V$ and $\phi H$ which are frequency divided to $\frac{1}{2}$ by flip-flops 611 and 612 are supplied to the address generating means 29 to 32 via the AND gates 624 and 626 and OR gates 627 and 628. At that time, a low level signal which is obtained with the high level output of the OR gate 610 inverted by the inverter 609 is supplied to the AND gates 623 and 625. Therefore, the output level of the AND gates 623 and 625 become low. At the same time, a low level signal is also supplied to the AND gates 601 to 604 to cause the output levels of these AND gates to remain low. The 80 mm address generating means 31 is connected to the OR gate 607 which receives the high level signal indicative of trimming corresponding to the focal length of 80 mm. The 80 mm address generating means 31 then generates address data which is $\frac{1}{2}$ frequency divided by a clock signal. Further, the address of the RAM 7 is determined via the AND gate 19 which is connected to the output terminal of the OR gate 607.

The image displayed on the quadrant display image plane is multiplied by two times both in the vertical and horizontal directions and is thus spread over the whole display image plane through the above-stated operation. The operation is also performed likewise through the OR gates 605, 607 and 608, etc. when any of other signals is produced from the trimming selection means 34.

Figure 8C:
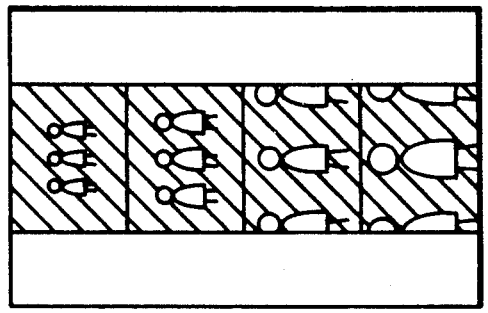
FIGS. 8(a), 8(b) and 8(c) are illustrations of display image planes obtained by a second embodiment of this invention.
Figure 8A:
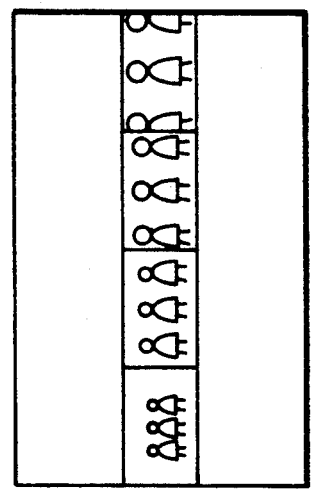
Figure 8B:
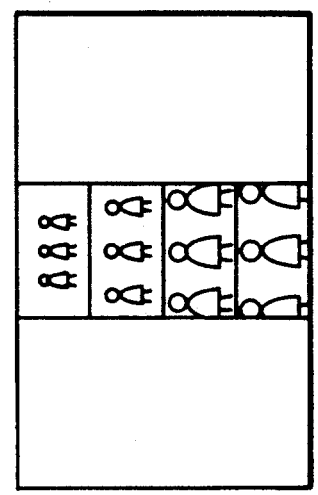

FIGS. 8(a) to 8(c) show a second embodiment of the invention. In comparing zoomed image planes with each other, a method of arranging them in vertical or horizontal alignment makes comparison easier than a method of arranging them around vertically and sidewise as shown in FIGS. 8(a) and 8(b). However, such arrangement makes images too small to show details. This problem can be solved by turning round the alignment of image planes as shown in FIG. 8(c). The display of image planes as shown in FIG. 8(a) or 8(b) is readily feasible by just changing the addresses of FIGS. 3 to 5. Whereas, the display image plane alignment of FIG. 8(c) necessitates a circuit arrangement as shown in FIG. 9.

Figure 9:
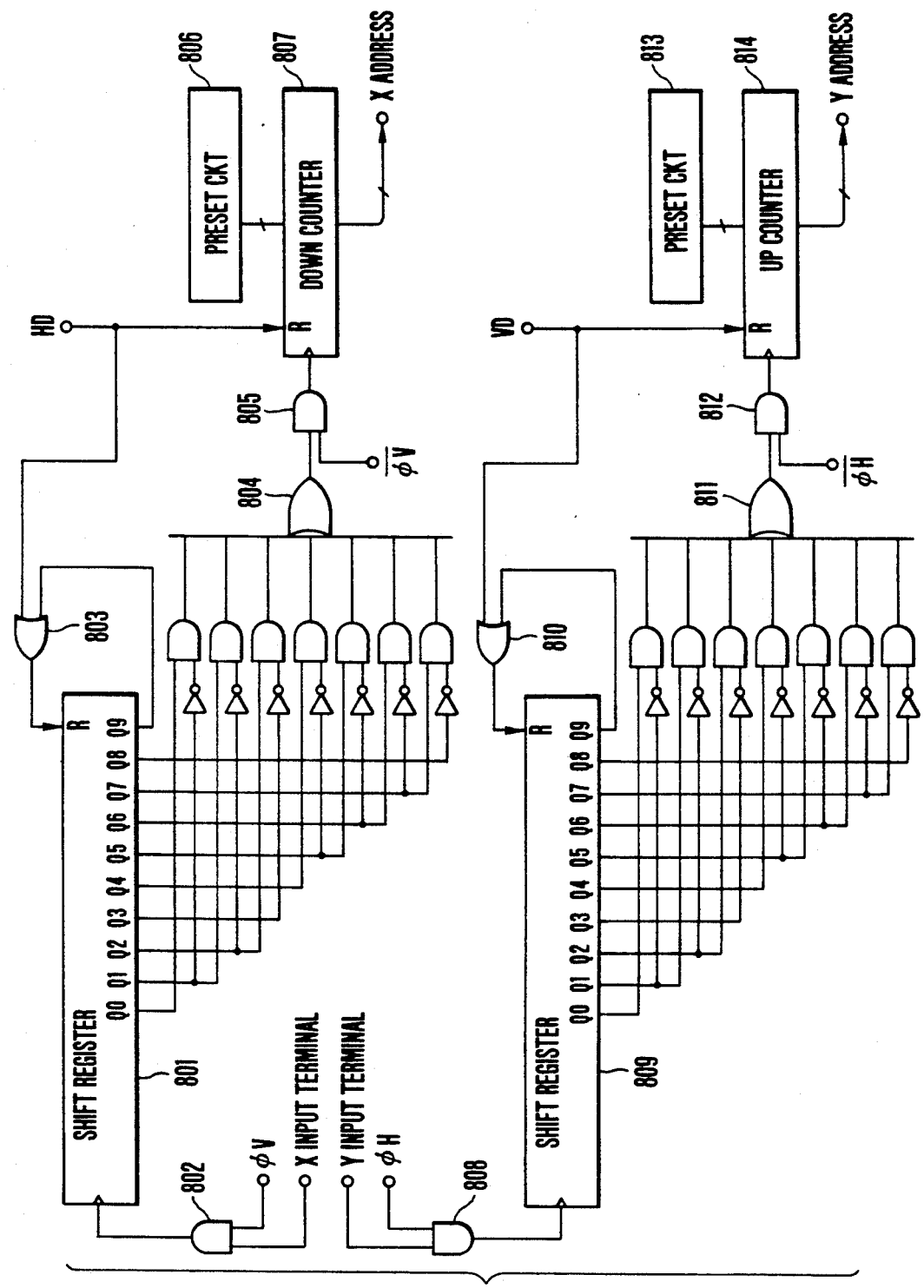
FIG. 9 is a circuit diagram showing a circuit arrangement for obtaining the display image planes of FIGS. 8(a), 8(b) and 8(c).

FIG. 9 shows a circuit required for obtaining the display represented by FIG. 8(c). In this case, the address generating means 29 to 32 are changed. This differs from the circuit of FIG. 5 in the following point: The counter which generates the X address is replaced with a down counter 807. The input clock signal is changed from the clock signal $\phi H$ to the clock signal $\phi V$. The input clock signal of the up counter 814 is changed from the clock signal $\phi V$ to the clock signal $\phi H$.

The above-stated change rotates the display image 90 degrees. Further, the preset value and the number of clock pulses obtained by the frequency dividing actions of the shift registers 801 and 809 are easily obtainable in accordance with the method of FIG. 2.

Figure 10:
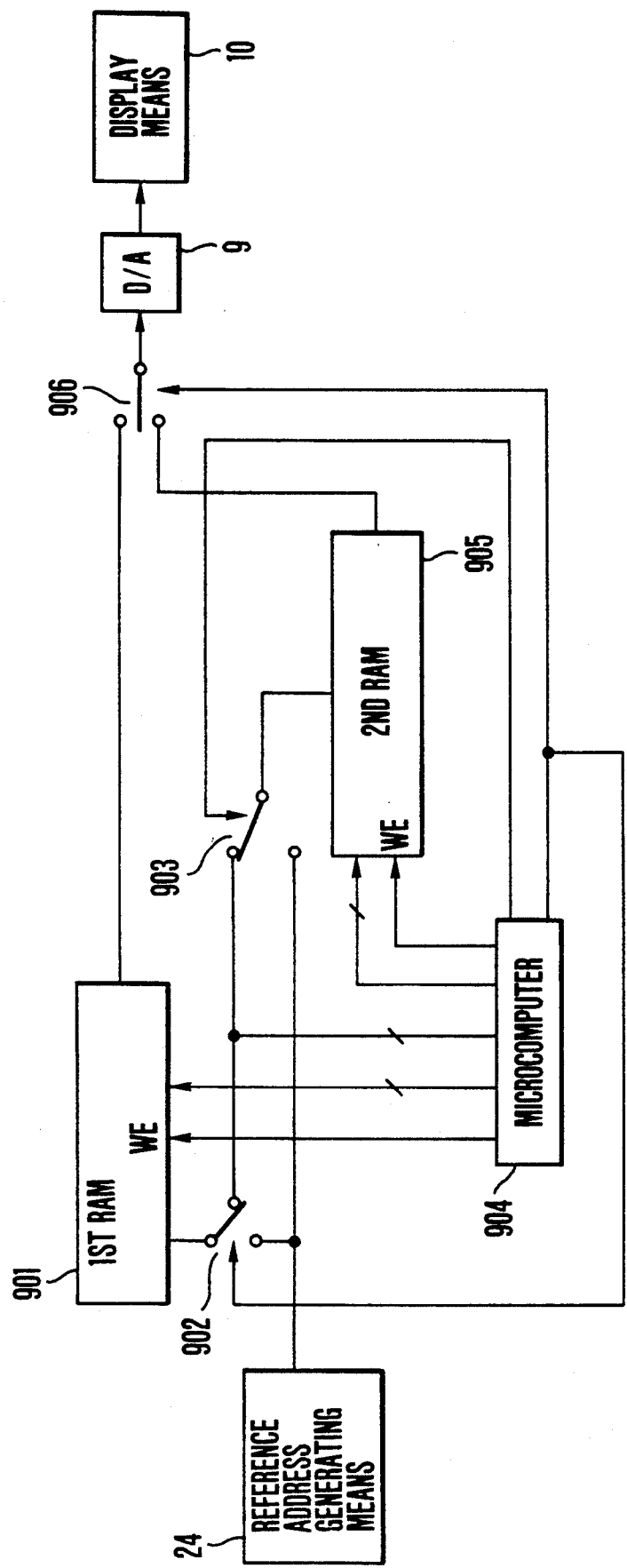
FIG. 10 is a circuit diagram showing a third embodiment of the invention.

FIG. 10 shows a third embodiment of this invention. The third embodiment uses a microcomputer. With a microcomputer 904 employed, the processing speed is too slow to control the image signal. Therefore, in taking an image in, data is stored with a first RAM 901 driven via a switch 902 by the reference address generating means 24. Then, the writing action is stopped by the microcomputer 904. Further, the microcomputer 904 shifts the positions of switches 902 and 903 to send address data from the microcomputer 904 to the first RAM 901 and a second RAM 905, respectively. By this, the addresses shown in FIGS. 2(a) to 2(d) are read out from the first RAM 901 and written in the second RAM 905. Upon completion of writing, the positions of the switches 902 and 903 are reversed to have addresses supplied from the reference address generating means 24 in accordance with the timing of the display. Further, when a switch 906 is controlled by the microcomputer 904, either the first RAM 901 causes a still picture to be displayed via the D/A converting means 9 or the second RAM 905 causes a multi-image plane to be displayed via the D/A converting means 9.

Figure 11A:
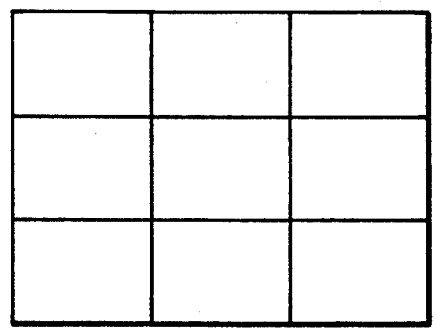
FIGS. 11(a), 11(b) and 11(c) are illustrations of display image plane obtained by a fourth embodiment of the invention.
Figure 11B:
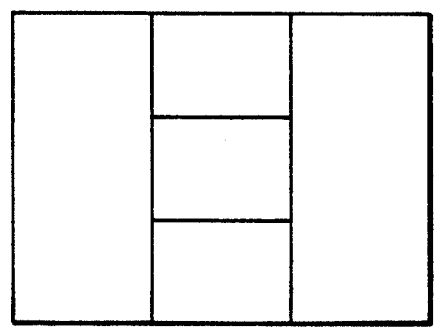
Figure 11C:
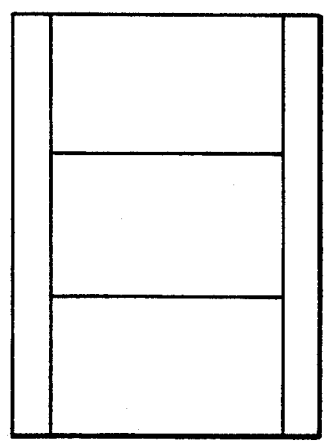

FIGS. 11(a) through 11(c) show a fourth embodiment of the invention. The size of images becomes smaller and more indiscernible as the number of component image planes of a multi-image plane increases. To solve this problem, the multi-image plane display is divided into two stages. In the first stage, all the trimmed image planes are displayed as shown in FIG. 11(a). In the second stage, one specific image plane is designated and three image planes including the specific image plane and two adjoining image plane are displayed as shown in FIG. 11(b) by changing addresses in a manner similar to the method shown in FIGS. 8(a) to 8(c) or as shown in FIG. 11(c). This arrangement facilitates trimming designation.

Figure 12:
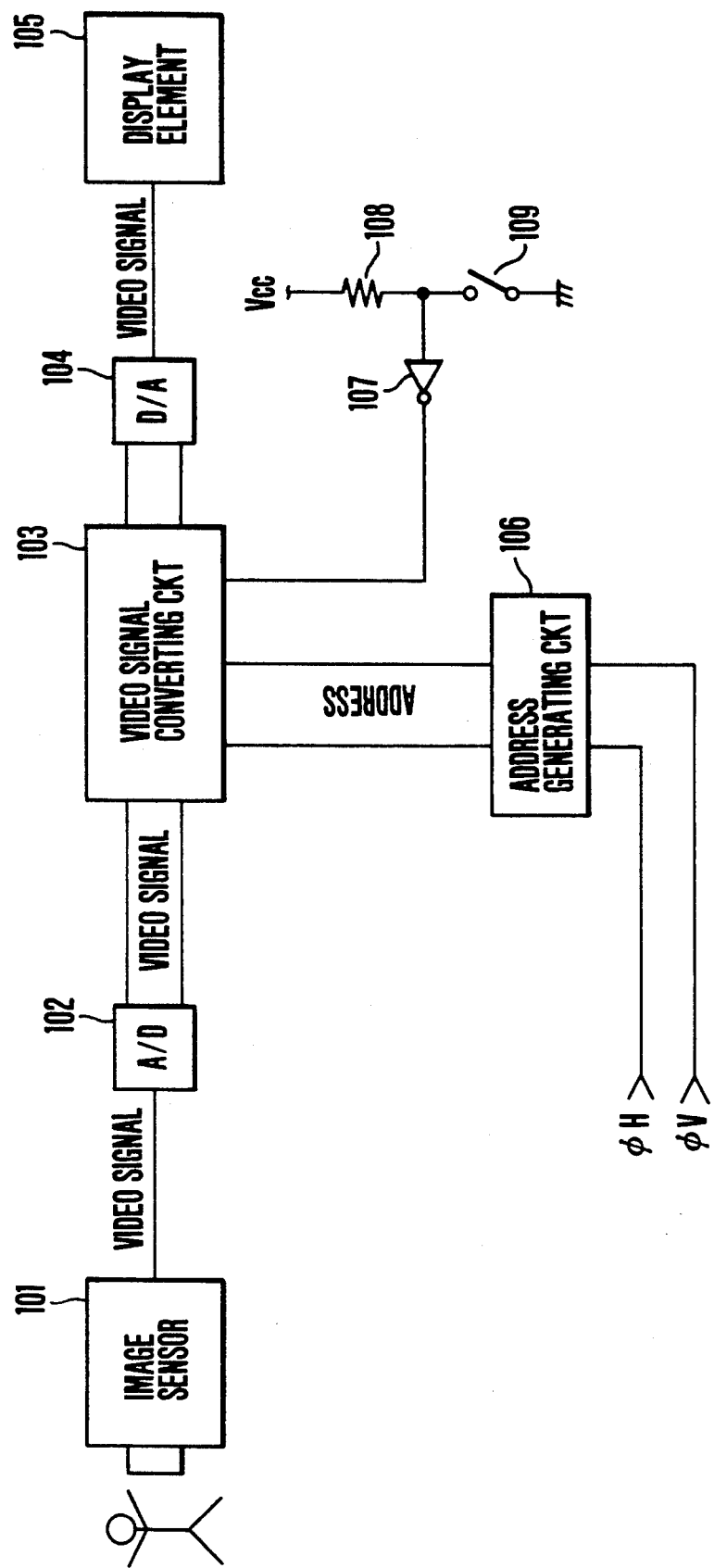
FIG. 12 is a circuit diagram showing a fifth embodiment of the invention.

FIG. 12 is a block diagram showing a fifth embodiment of the invention. Referring to FIG. 12, an image sensor 101 is a CCD or the like which is arranged to convert an object's image into a video signal. An A/D converter 102 is arranged to digitize the video signal. A video signal converting circuit 103 is arranged to convert the luminance of the video signal according to an address which will be described later. A D/A converter 104 is arranged to convert the output of the video signal converting circuit 103 back to an analog signal form. A display element 105 is arranged to change the video signal into an image. An address generating circuit 106 is arranged to generate, according to a horizontal transfer clock signal $\phi H$ and a vertical transfer clock signal $\phi V$, an address which is to be supplied to the video signal converting circuit 103. The illustration includes an inverter 107; a resistor 108; and a switch 49 which is arranged to turn on and off the above stated video signal converting circuit 103.

Figure 13:
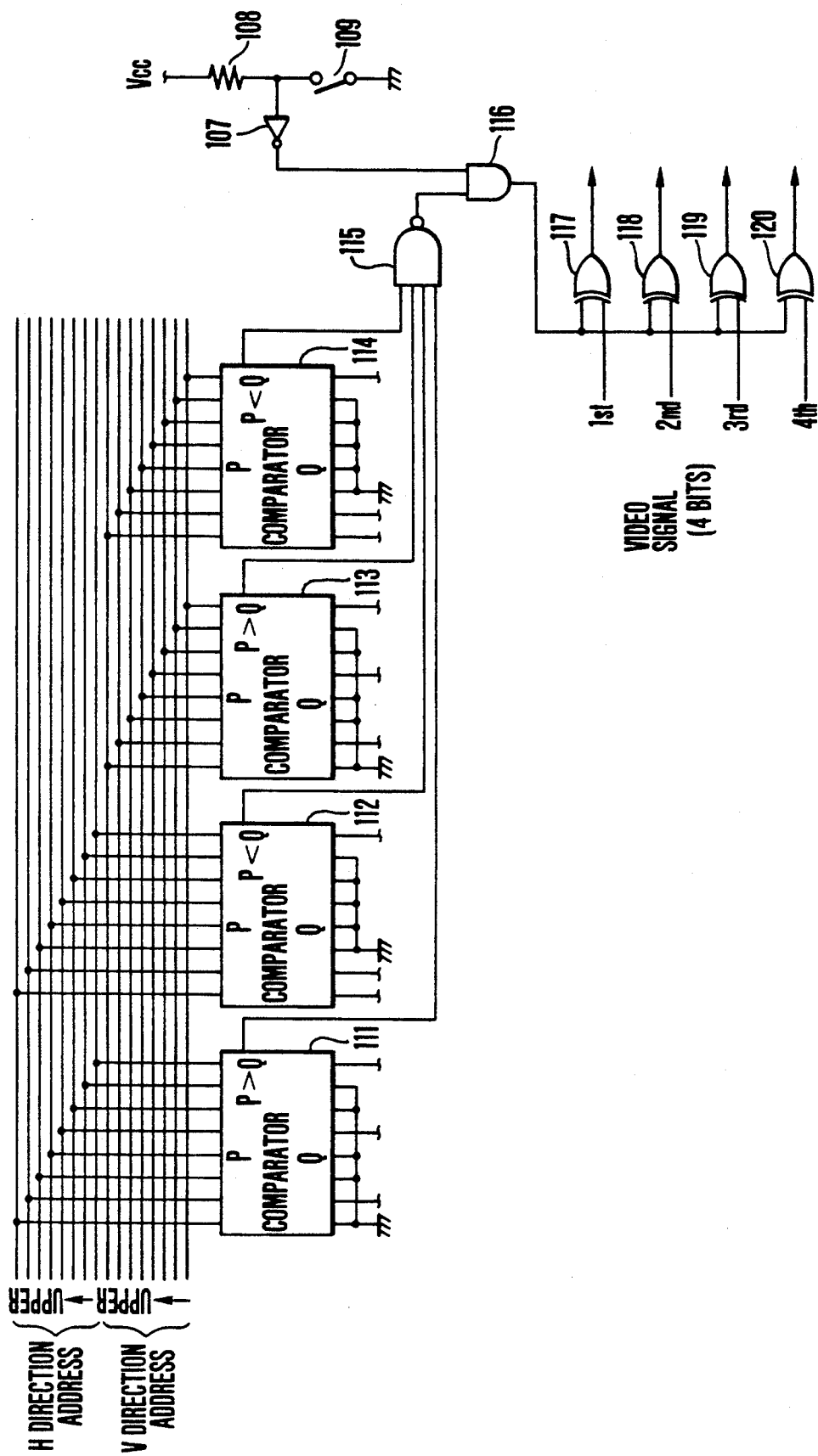
FIG. 13 is a circuit diagram showing the arrangement of a video signal converting circuit of FIG. 12.
Figure 14:
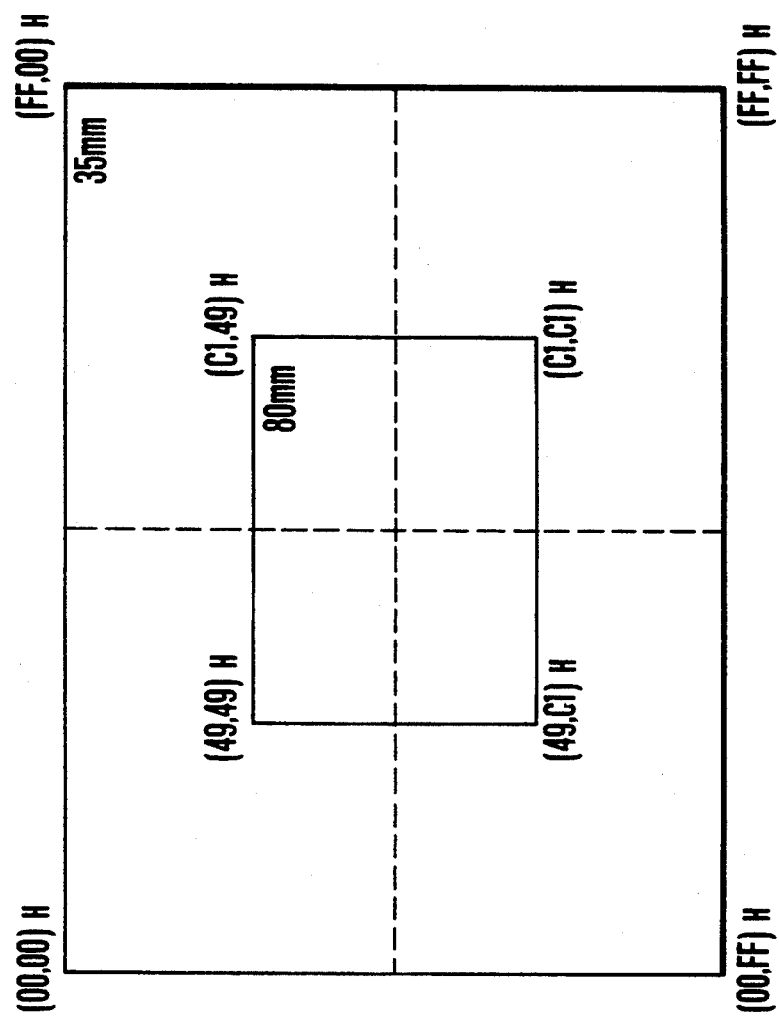
FIG. 14 is an illustration of a trimmed area.

FIG. 13 shows the details of the video signal converting circuit 103 of FIG. 12. FIG. 14 shows a trimming area, or a photographing angle of view.

In the case of FIG. 13, the video signal is of 16 gradations consisting of first, second, third and fourth bits with the fourth bit arranged to be the most significant bit. The address is set with eight bits (256) in the horizontal direction and eight bits (256) in the vertical direction and can be expressed by the coordinates (00, 00)H to (FF, FF)H as shown in FIG. 14. Assuming that the trimming angle of view or photographing angle of view is 80 mm, for example, the trimming range (which hereinafter means the photographing angle of view) is an area encompassed with coordinates (49, 49)H, (C1, 49)H, (49, C1)H and (C1, C1)H.

Referring to FIG. 13, the embodiment is arranged to have the output of a NAND gate 115 at "1" only when comparators 111, 112, 113 and 114 and the NAND gate 115 cause the address to be outside a trimming range. When a switch 109 is turned on, the output of an AND gate 116 becomes "1"; and all the video signals are inverted by exclusive OR gates 117, 118, 119 and 120. As a result, a display element 105 which is an LCD panel or the like (see FIG. 12) has its area located outside the trimming range displayed in a black-and-white inverted state.

Figure 15:
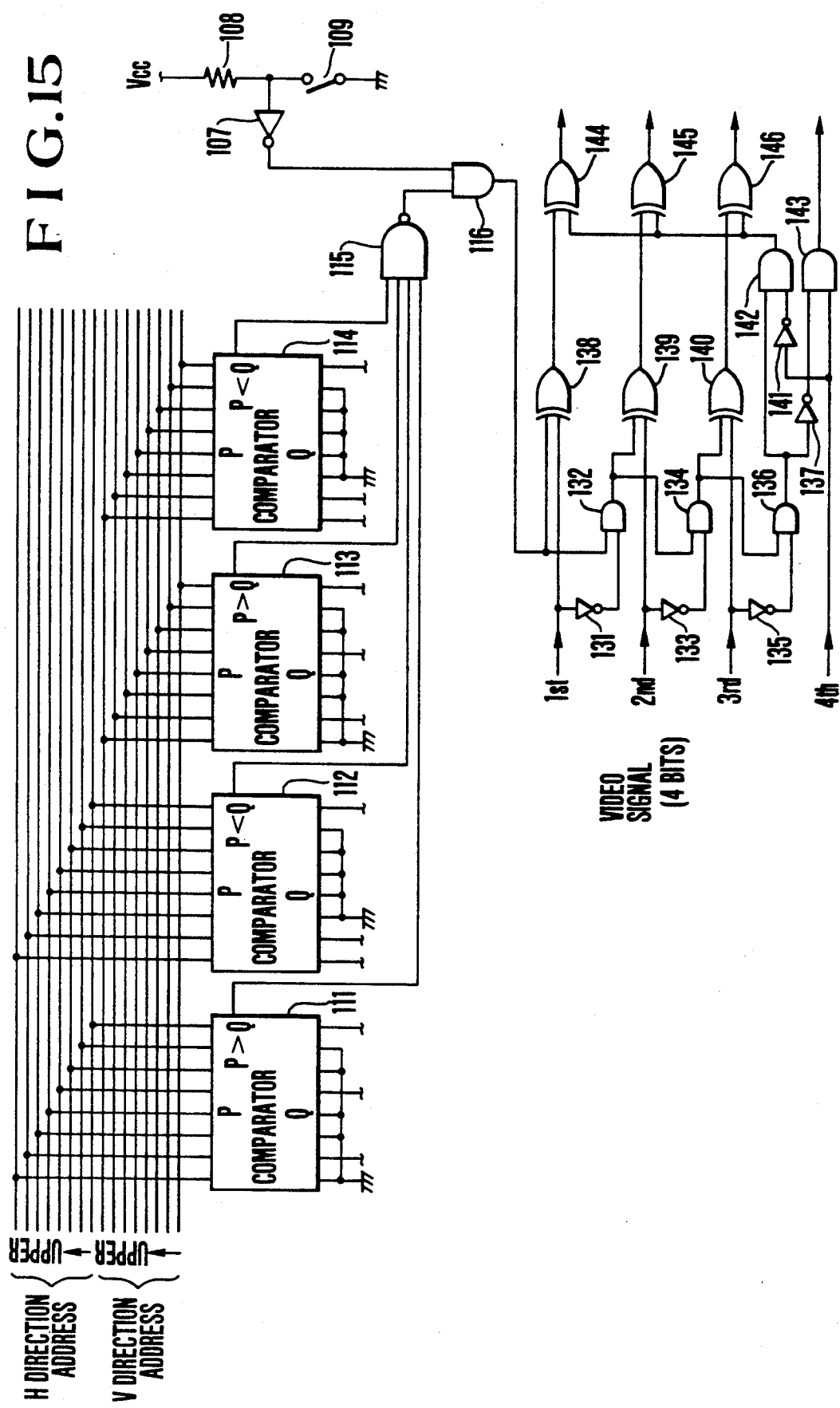
FIG. 15 is a circuit diagram showing the circuit arrangement of a sixth embodiment of the invention.

FIG. 15 is a circuit diagram showing a sixth embodiment of the invention, which is illustrated in relation to FIG. 13. In this case, the video signal converting circuit is arranged to lower by one step the luminance of the area located outside the trimming range.

Referring to FIG. 15, the illustration includes inverters 131, 133, 135, 137 and 141; AND gates 132, 134, 136, 142 and 143; and exclusive OR gates 138, 139, 140, 144, 145 and 146. In the case of the circuit of FIG. 15, the output of the AND gate 116 becomes "1" outside the trimming range when the switch 109 is turned on. Then, "1" is subtracted from the video signal at the exclusive OR gates 144, 145 and 146 and the AND gate 143 before it is produced. However, in case that all the bits of the video signal are "0," the video signal is produced as it is. As a result, the image on the display element 105 has a normal degree of luminance within the trimming range but has its degree of luminance lowered by one step outside the trimming range. The above stated "normal degree" means an output obtained under automatic gain control (AGC).

Figure 16:
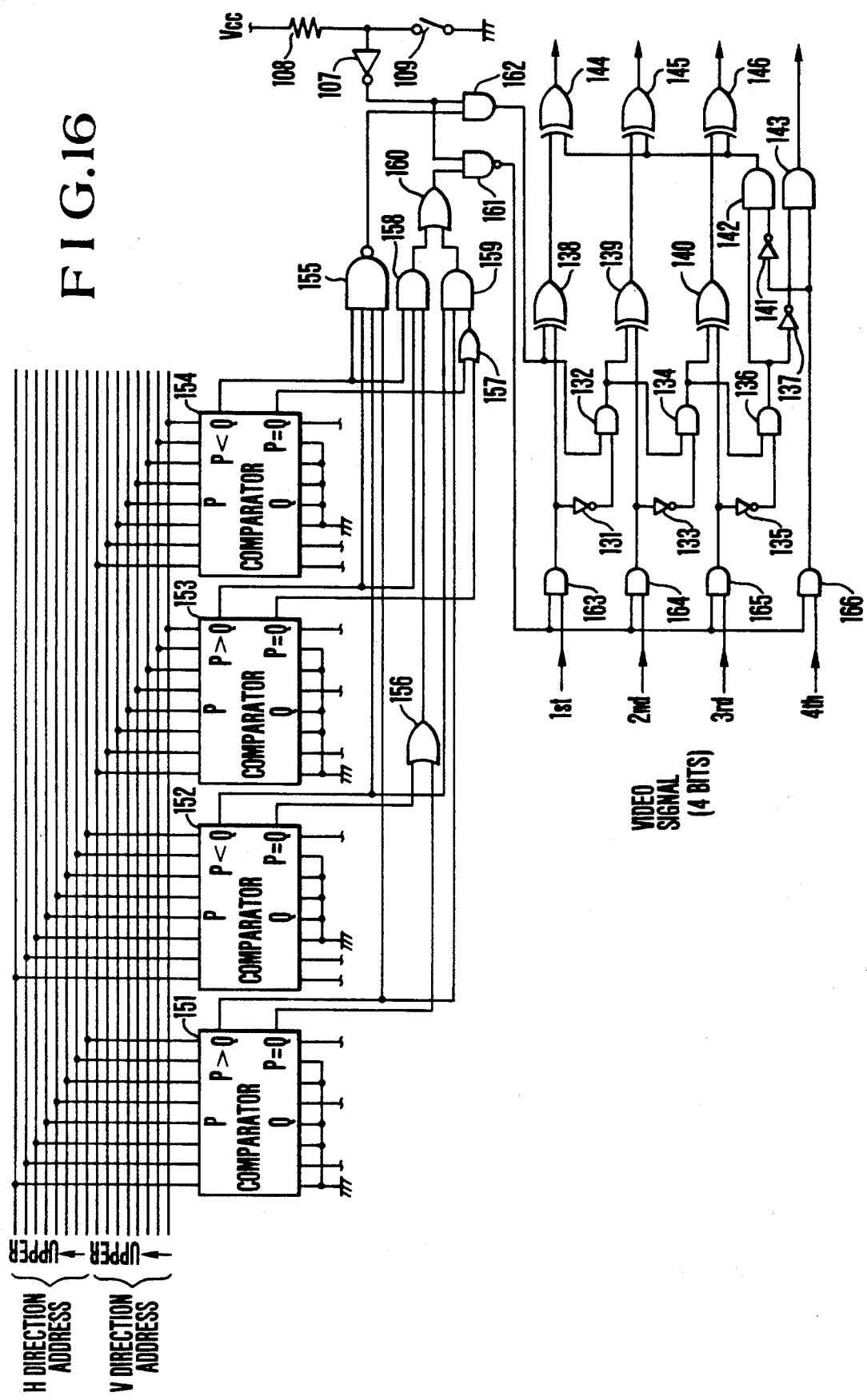
FIG. 16 is a circuit diagram showing the circuit arrangement of a seventh embodiment of the invention.

FIG. 16 is a circuit diagram showing a seventh embodiment of the invention. In this case, the circuit of FIG. 15 is modified by adding thereto a circuit which is arranged to display a trimming frame at a zero degree of luminance, i.e., a black trimming frame. The illustration includes comparators 151, 152, 153 and 154; AND gates 158, 159, 162, 163, 164, 165 and 166; AND gates 155 and 161; and OR gates 156, 157 and 160.

In the case of the circuit of FIG. 16, when the address comes to the trimming frame part, the comparators 151, 152, 153 and 154, the OR gates 156, 157 and 160 and the AND gates 158 and 159 cause the output level of the OR gate 160 to become high. Therefore, when the switch 109 turns on, the output level of the NAND gate 161 becomes low only at the trimming frame part. Then the first, second, third and fourth bits of the video signal is cut off by the AND gates 163, 164, 165 and 166. As a result, the AND gates 163, 164, 165 and 166 produce low level outputs. In FIG. 16, the component parts other than the parts described above have the same functions as those of the corresponding parts of FIG. 15. In accordance with the above-stated arrangement of this invention, a black trimming frame appears on the display element along with the image. In addition to that, in the area outside the trimming range, the image is displayed with luminance lowered by one step from its luminance obtained under automatic gain control.

Figure 17:
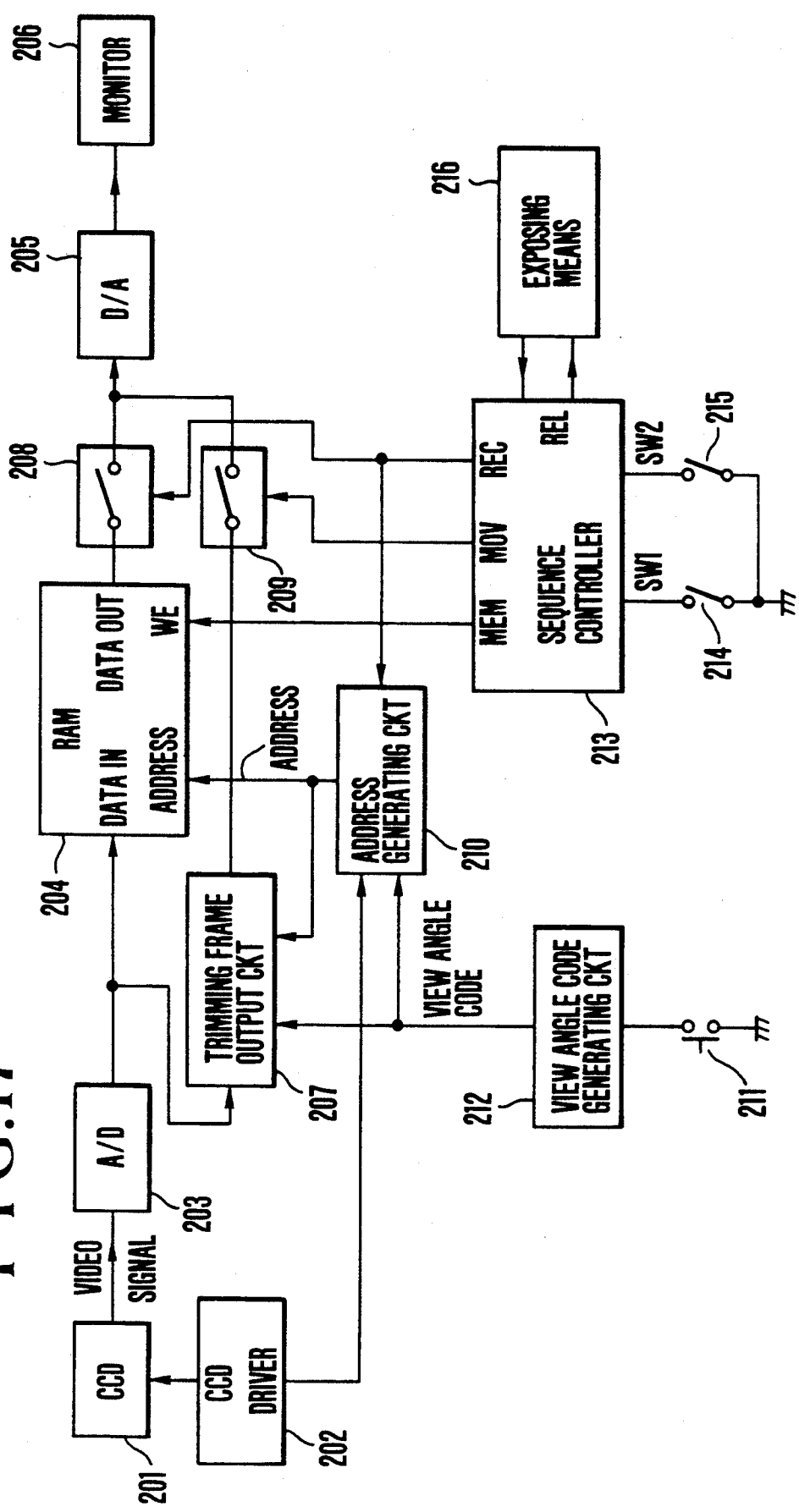
FIG. 17 is a circuit diagram showing the whole circuit of an eighth embodiment of the invention.

FIG. 17 shows the whole circuit of a camera which is arranged as an eighth embodiment of the invention. Referring to FIG. 17, a CCD 201 is arranged to convert an object's image into a video signal. A CCD driver 202 is arranged to drive the CCD 201. An A/D converter 203 is arranged to digitize the video signal. A RAM 204 is arranged to store the video signal produced from the A/D converter 203. The RAM 204 is in a writing mode when the "WE" input thereof is at "1" and in a reading mode when it is at "0". A D/A converter 205 is arranged to convert the output of the RAM 204 into an analog signal. A monitor 206 is arranged to convert the output of the D/A converter 205 into a visible image. A trimming frame output circuit 207 is arranged to synthesize and apply a trimming frame or photographing angle of view to the video signal produced from the A/D converter 203. Switching means 208 and 209 are arranged to turn on and off the connection of the RAM 204 and that of the output of the trimming frame output circuit 207 with the D/A converter 205. An address generating circuit 210 is arranged to produce the addresses of the RAM 204 and the trimming frame output circuit 207. A view angle changing button 211 is arranged to change the trimming angle of view. A view angle code generating circuit 212 is arranged to generate one of varied view angle codes every time the button 211 is pushed. A sequence controller 213 is arranged to control the operation of the whole camera. A switch SW1 214 is arranged to be turned on by the first stroke of a shutter button. A switch SW2 215 is arranged to be turned on by the second stroke of the shutter button. There is provided an exposure means 216 for exposing a film to the light of the object's image.

In the case of this embodiment, as will be further described later, a motion picture is displayed when the switch SW1 214 is turned on. An exposure action and imprinting the view angle code are performed on the film and the video signal is written into the RAM 204 when the second switch SW2 215 is turned on. After that, the mode of the camera changes from a motion picture mode to a still picture mode. The camera is then initialized with the two switches 214 and 215 turned off.

Figure 19:
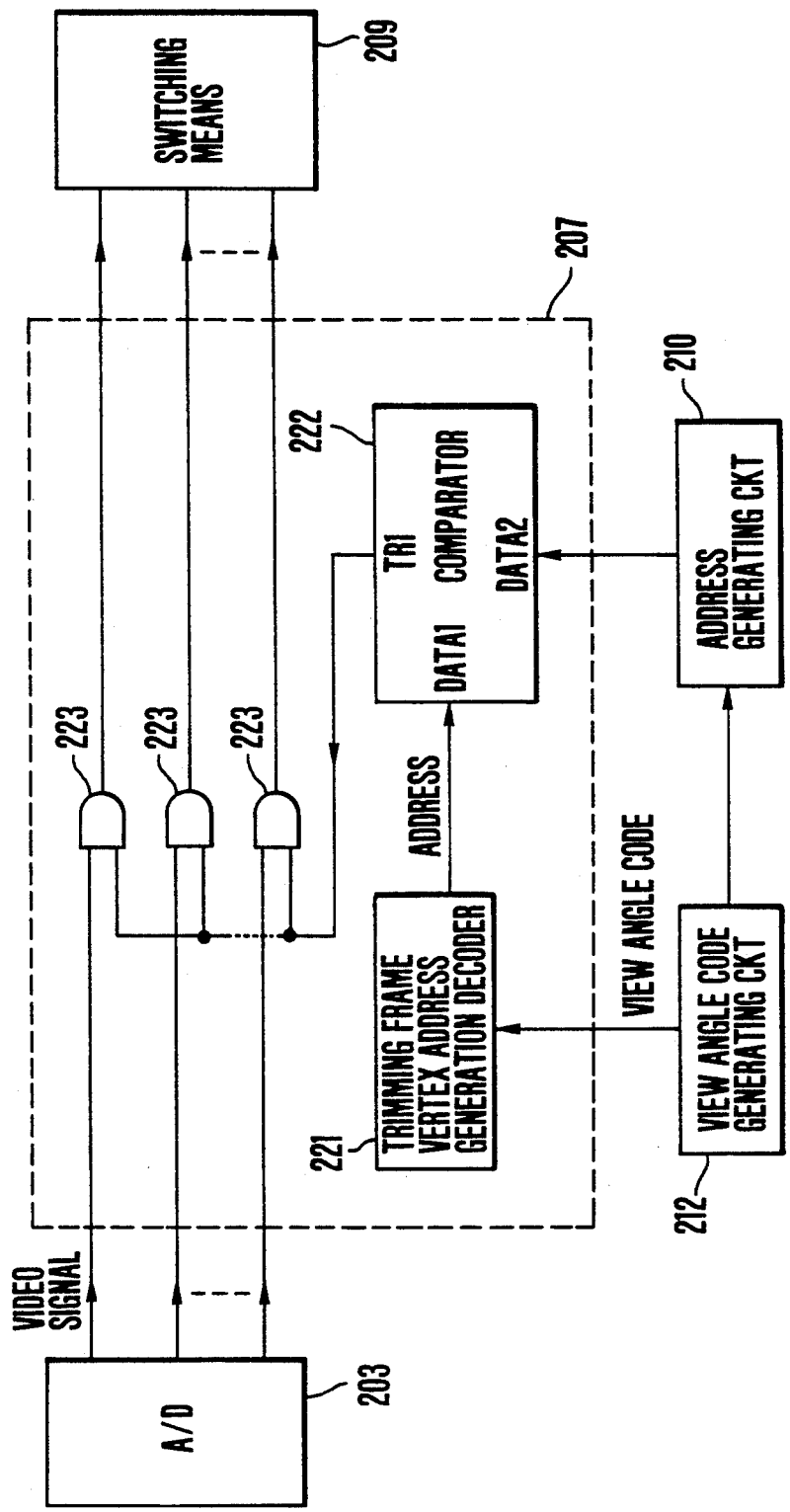
FIG. 19 is a circuit diagram showing the details of a trimming frame output circuit of FIG. 17.
Figure 22:
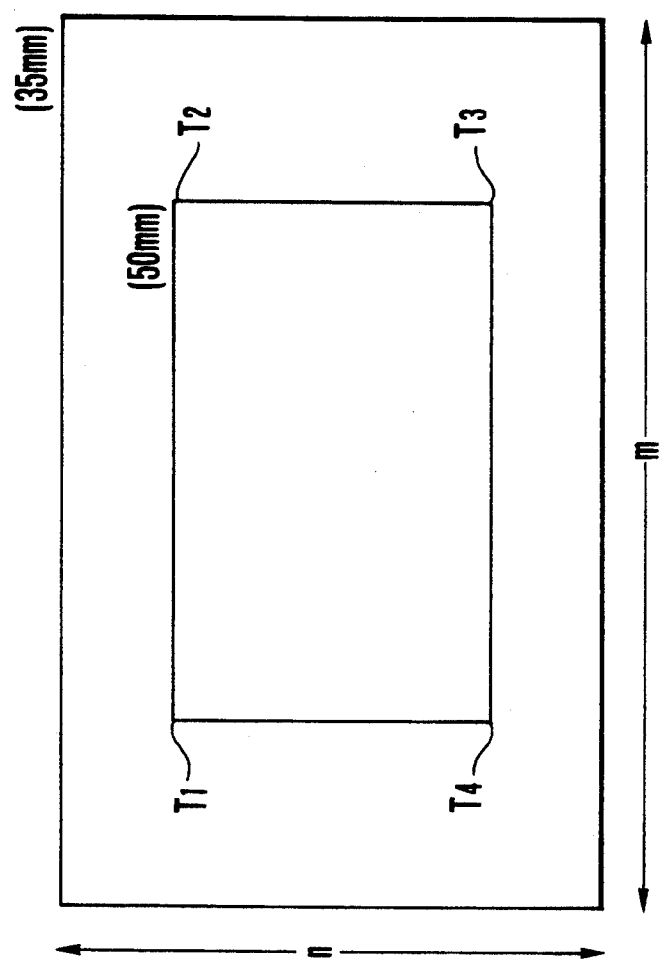
FIG. 22 is an illustration of an area of a memory to be trimmed by the eighth embodiment.

FIG. 19 shows the details of the trimming frame output circuit 207 of FIG. 17. Referring to FIG. 19, a trimming frame vertex address generation decoder 221 is arranged to produce the addresses of the four corner vertexes of the trimming frame corresponding to the angle of view. In case that the angle of view shows 50 mm, for example, the decoder 221 produces vertex addresses T1, T2, T3 and T4 as shown in FIG. 22 which will be described later. A comparator 222 is arranged to have the output of the decoder 221 and the address produced from an address generating circuit 210 as two inputs DATA1 and DATA2. The circuit includes AND gates 223.

The trimming frame output circuit 207 which is arranged as shown in FIG. 19 operates as follows: First, the inputs DATA1 and DATA2 are compared with each other at the comparator 222. If the address is not on line segments T1–T2, T2–T3, T3–T4 and T4–T1 shown in FIG. 22, the AND gate 223 is allowed to output a video signal as it is. If the address is on line segments T1–T2, T2–T3, T3–T4 and T4–T1, the comparator 222 produces a signal TR1 at "0". Then, in this case, the video signal is cut off at the AND gate 223 and an output "0" is produced. This results in a black trimming frame which is displayed on the monitor 206 of FIG. 17 along with an image.

FIG. 20 shows the details of the address generating circuit 210 of FIG. 17. Referring to FIG. 20, the illustration includes AND gates 231; an H direction leading address generation decoder 232 which is arranged to generate a leading address located foremost in the horizontal (H) or transverse direction of the trimming range; a V direction leading address generation decoder 233 which is arranged to generate a leading address located foremost in the vertical (V) or longitudinal direction of the trimming range; a frequency divider 234 which is arranged to frequency-divide the horizontal transfer clock signal $\phi H$ and the vertical transfer clock signal $\phi V$ at a rate set according to the above stated set angle of view; a presettable counter 235 which is arranged to be preset by a horizontal synchronizing signal HD; and another presettable counter 236 which is arranged to be preset by a vertical synchronizing signal VD.

The address generating circuit 210 which is arranged as shown in FIG. 20 operates as follows except in the event of still picture reproduction. When a signal "REC" of the sequence controller 213 becomes "0," the view angle codes are cut off at the AND gates 231. Both the address generation decoders 232 and 233 receive input signal of "0". Then the outputs of both the decoders 232 and 233 become "0". At the frequency divider 234, the input thereof is produced as it is. Therefore, the outputs of the two counters 235 and 236 are incremented from 0 address at every clock pulses of the clock signals $\phi H$ and $\phi V$. The counters are preset at "0" by the above stated synchronizing signals HD and VD. As a result, with the number of picture elements in the horizontal and vertical directions of the CCD 201 of FIG. 17 assumed to be m and n, positions on a matrix of m×n correspond to the addresses supplied from the two counters 235 and 236. After a shutter release, all data are written into the RAM 204 at addresses corresponding to those of the CCD 201.

In the event of still picture reproduction, the signal "REC" of the sequence controller 213 becomes "1". The view angle codes supplied to the AND gates 231 are supplied to the address generation decoders 232 and 233 as they are. Then, the decoders 232 and 233 produce leading addresses in the horizontal and vertical directions of the trimming range according to the view angle codes. Further, at the frequency divider 234, the clock signals $\phi H$ and $\phi V$ are frequency-divided according to the view angle codes at the following rate.

Number of picture elements within trimming range in the H direction (or V direction of CCD) / Total number of picture elements in the H (or V) direction of CCD (1)

Therefore, the outputs of the counters 235 and 236 are incremented from the leading addresses in the horizontal (H) and vertical (V) directions of the trimming range at every clock pulses of the outputs QH and QV of the frequency divider 234. By the time when they are incremented for all the picture elements of the trimming range in the H and V directions thereof, the CCD driver 202 has produced the clock pulses of the signals $\phi H$ and $\phi V$ corresponding to all the picture elements in the H and V directions. Therefore, the terminals HD and VD of the CCD driver 202 produce pulses to set the two counters 235 and 236 again at the leading addresses within the trimming range.

By the operation described above, only the data of the trimming range obtained within the RAM 204 is supplied to the monitor 206. As a result, the data of the trimming range is displayed in an enlarged state.

Figure 21:
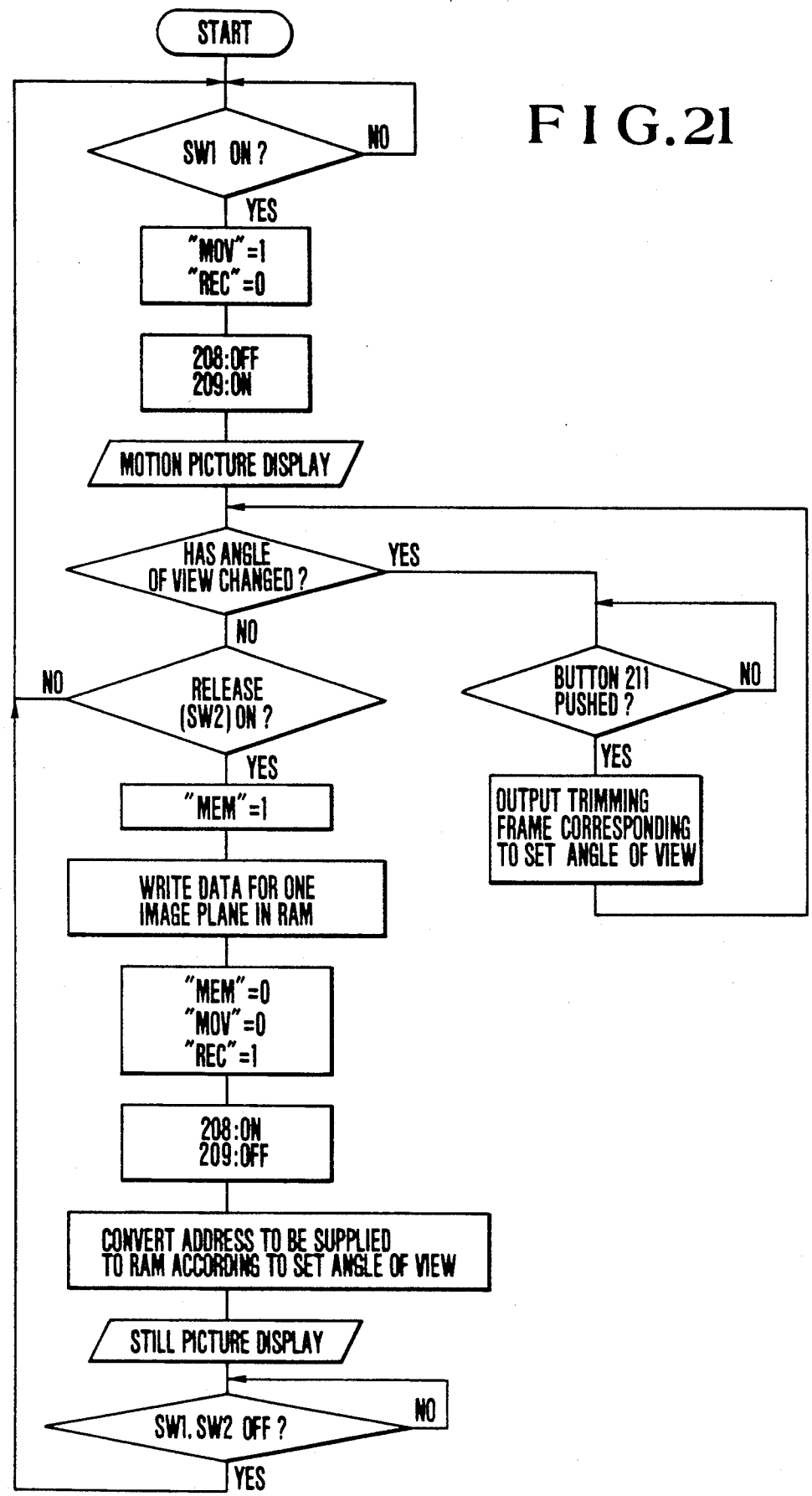
FIG. 21 is a flowchart showing the flow of operation of the eighth embodiment (FIG. 17).

Referring to FIG. 21, the flow of the whole circuit shown in FIG. 17 is as follows: When the switch SW1 214 is turned on, the sequence controller 213 causes the signals "MOV" and "REC" to be at "1" and "0" respectively. This causes the switching means 209 to turn on and the switching means 208 to turn off. Therefore, the signal which is supplied via the D/A converter 205 to the monitor 206 is a signal obtained by combining the trimming frame with the video signal produced from the A/D converter 203. Since the CCD 201 supplies the A/D converter 203 with one frame portion of the video signal at a time in a given cycle, a motion picture is produced at the monitor 206. For changing a trimming angle of view, a desired angle of view is obtainable by pushing the view angle changing button 211. In that instance, a corresponding trimming frame is produced by the trimming frame output circuit 207 in accordance with a view angle code produced from the view angle code generating circuit 212.

FIG. 22 shows by way of example a trimming frame which defines an angle of view of 50 mm as against a full size angle of view of 35 mm.

Figure 18:
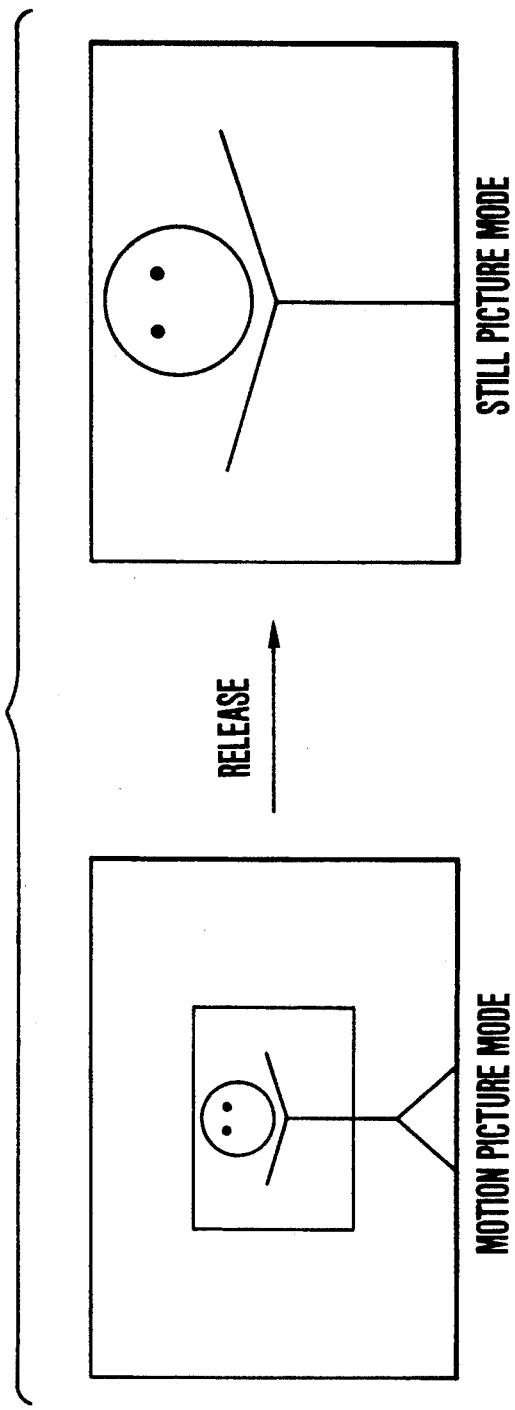
FIG. 18 are illustrations showing operating states obtained on a monitor of FIG. 17.

Next, the shutter is released by turning the switch SW2 215 on. The film is exposed to the light of an object's image by the exposure means 216. At the same time, view angle code is imprinted on the film. In this instance, a signal "MEM" from the sequence controller 213 becomes and remains at "1" for one frame period. One frame portion of data is then written into the RAM 204. Upon completion of the writing process, the signal "MEM" becomes "0" and the RAM 204 assumes the reading mode thereof. At the same time, signals "MOV" and "REC" respectively becomes "0" and "1" to cause the switching means 208 to turn on and the switching means 209 to turn off. As a result, the contents of the RAM 204 are produced as a still image and supplied to the monitor 206. Then, at the address generator 210 which is arranged to generate a reading address for reading from the RAM 204 changes the reading address. This causes the monitor 206 to display in an enlarged state thereon only the signal portion of the RAM 204 that is within the trimming range according to a view angle code produced by the view angle code generating circuit 212. The camera is brought from this still picture mode back to its initial state when the switches SW1 214 and SW2 215 are turned off. Further, FIG. 18 shows the operation of the embodiment to be performed on a display panel. As shown in FIG. 18, a trimming frame display is arranged to be automatically changed over to an enlarged display following an exposure action.

It should be noted that although the above embodiments of the invention have been described with respect to a camera capable of pseudo-zooming by using a trimming method, the invention may be applied to a camera having an ordinary optical system capable of varying the focal length.

What is claimed is:

1. A camera having photographic optical means for photographing an object, comprising:
   a) display means for displaying object image information within a single frame; and
   b) control means causing said display means to simultaneously display a plurality of object images having different angles of view respectively shown in different areas of the frame of said display means without varying a focal length of said photographic optical means.

2. A camera according to claim 1, wherein said display means comprises an electronic view finder.

3. A camera according to claim 1, wherein said control means comprises selection means for selecting one of said plurality of object images having different angles of view and causing said display means to display the selected object image in an enlarged state.

4. A camera according to claim 1, wherein said control means controls said display means to display a plurality of images in one row.

5. A camera according to claim 4, wherein said control means controls said display means to display the plurality of images in one file.

6. A camera according to claim 4, wherein said control means controls said display means to display the plurality of images in a row in the order of angles of view.

* * * * *

UNITED STATES PATENT AND TRADEMARK OFFICE
CERTIFICATE OF CORRECTION

PATENT NO. : 5,172,234
DATED : December 15, 1992
INVENTOR(S) : Arita et al.

It is certified that error appears in the above-identified patent and that said Letters Patent is hereby corrected as shown below:

Title page, item,
[75] INVENTORS:

"Hiroshi Arita, Kanagawa;" should read --Hiroshi Arita, Yokohama;--.

COLUMN 1:

Line 36, "above" should read -- above- --.

COLUMN 2:

Line 13, "zoomed up" should read --zoomed-up--; and
Line 23, "plane" should read --planes--.

COLUMN 3:

Line 7, "address and" should read --addresses and--;
Line 32, "an" should read --a--; and
Line 53, "have," should read --have--.

COLUMN 5:

Line 24, "above stated" should read --above-stated--;
Line 30, "above stated" should read --above-stated--; and
Line 63, "above stated" should read --above-stated--.

COLUMN 6:

Line 35, "zoomed up" should read --zoomed-up--.

COLUMN 7:

Line 8, "zoomed up" should read --zoomed-up--.

UNITED STATES PATENT AND TRADEMARK OFFICE
CERTIFICATE OF CORRECTION

PATENT NO. : 5,172,234

DATED : December 15, 1992

INVENTOR(S) : Arita et al.

It is certified that error appears in the above-identified patent and that said Letters Patent is hereby corrected as shown below:

COLUMN 8:

Line 49, "plane" should read --planes--.

COLUMN 9:

Line 2, "switch 49" should read --switch 109--;
Line 3, "above stated" should read --above-stated--;
Line 49, "above stated" should read --above-stated--; and
Line 58, "AND gates 155" should read --NAND gates 155--.

COLUMN 11:

Line 22, "above stated" should read --above-stated--;
Line 40, "above stated" should read --above-stated--; and
Line 59, "(or V direction of CCD" should read --(or V direction) of CCD--.

UNITED STATES PATENT AND TRADEMARK OFFICE
CERTIFICATE OF CORRECTION

PATENT NO. : 5,172,234
DATED : December 15, 1992
INVENTOR(S) : Arita et al.

It is certified that error appears in the above-identified patent and that said Letters Patent is hereby corrected as shown below:

COLUMN 12:

Line 46, "becomes" should read --become--.

COLUMN 13:

Line 16, "view finder." should read --viewfinder.--

Signed and Sealed this

Fifth Day of April, 1994

Attest:

BRUCE LEHMAN

Attesting Officer

Commissioner of Patents and Trademarks